United States Patent
Kim

(10) Patent No.: US 9,208,616 B2
(45) Date of Patent: Dec. 8, 2015

(54) MOBILE TERMINAL AND METHOD OF CONTROLLING THE SAME

(75) Inventor: Jonghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 421 days.

(21) Appl. No.: 13/429,199

(22) Filed: Mar. 23, 2012

(65) Prior Publication Data

US 2012/0242660 A1 Sep. 27, 2012

(30) Foreign Application Priority Data

Mar. 25, 2011 (KR) .................. 10-2011-0027009

(51) Int. Cl.
  *G06T 15/00* (2011.01)
  *G06T 19/20* (2011.01)
  *G06F 3/048* (2013.01)

(52) U.S. Cl.
  CPC .................. *G06T 19/20* (2013.01); *G06F 3/048* (2013.01); *G06T 2219/2004* (2013.01)

(58) Field of Classification Search
  CPC .......... G06F 3/017; G06F 3/044; G06F 3/048
  See application file for complete search history.

(56) References Cited

U.S. PATENT DOCUMENTS

| | | | |
|---|---|---|---|
| 2003/0118087 A1* | 6/2003 | Goldthwaite et al. | 375/219 |
| 2007/0058034 A1* | 3/2007 | Numazaki et al. | 348/51 |
| 2009/0282332 A1* | 11/2009 | Porat | 715/702 |
| 2010/0262280 A1* | 10/2010 | Miller et al. | 700/234 |
| 2010/0328438 A1* | 12/2010 | Ohyama et al. | 348/51 |
| 2011/0141052 A1* | 6/2011 | Bernstein et al. | 345/174 |
| 2011/0316679 A1* | 12/2011 | Pihlaja | 340/407.2 |
| 2012/0140255 A1* | 6/2012 | Tanaka | 358/1.13 |

* cited by examiner

*Primary Examiner* — Devona Faulk
*Assistant Examiner* — William Beutel
(74) *Attorney, Agent, or Firm* — Lee, Hong, Degerman, Kang & Waimey

(57) ABSTRACT

A mobile terminal and a method of controlling a mobile terminal are provided. A depth level of a stereoscopic graphic object using binocular parallax is controlled according to a user's usage pattern, and displaying of the stereoscopic graphic object is controlled according to various events such as various input signals.

30 Claims, 43 Drawing Sheets

FIG. 20
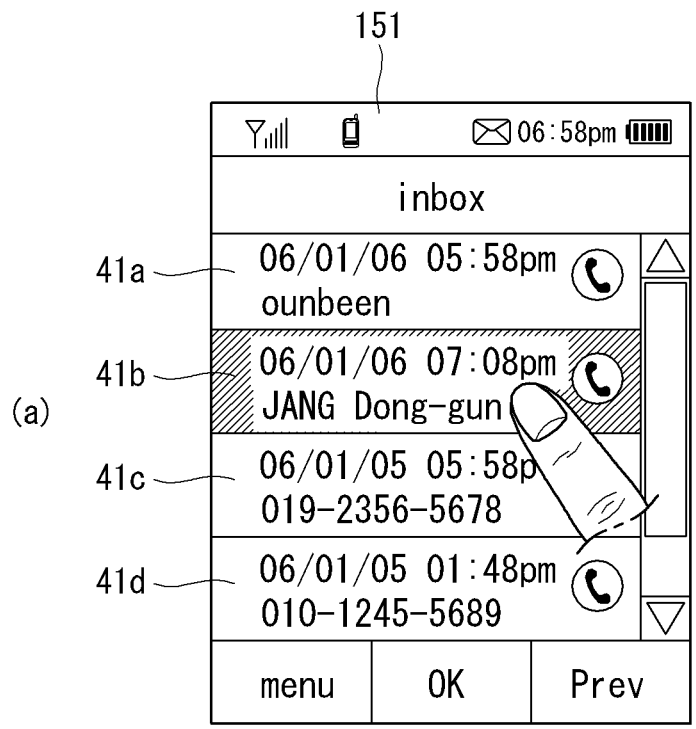
(a)
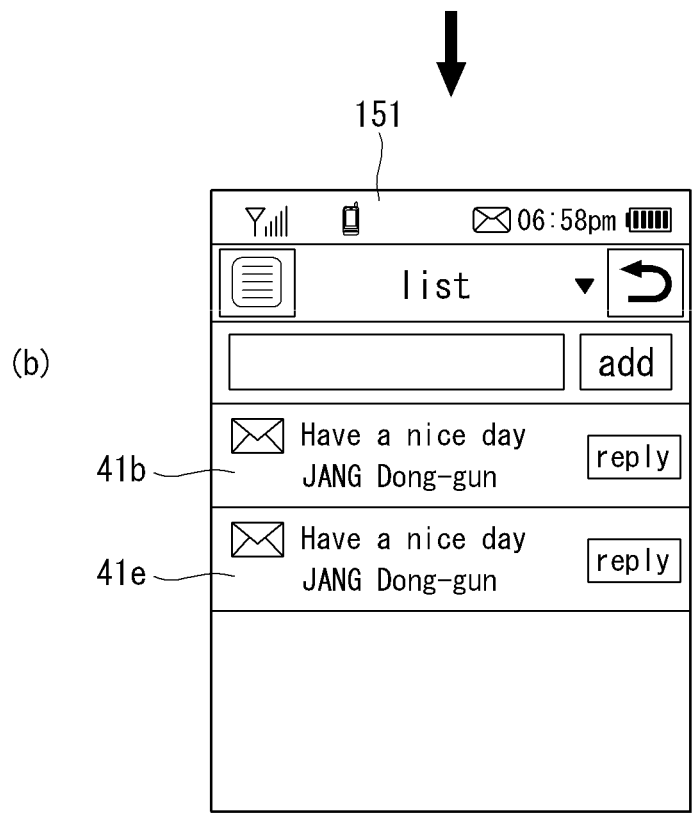
(b)

MOBILE TERMINAL AND METHOD OF CONTROLLING THE SAME

CROSS-REFERENCE TO RELATED APPLICATIONS

Pursuant to 35 U.S.C. §119(a), this application claims the benefit of earlier filing date and right of priority to Korean Patent Application No. 10-2011-0027009, filed on Mar. 25, 2011, the contents of which are hereby incorporated by reference herein in its entirety.

BACKGROUND

1. Field

The present invention relates to a mobile terminal and, more particularly, to a mobile terminal in which a depth level of a stereoscopic graphic object using binocular parallax according to a usage pattern of a user and displaying of the stereoscopic graphic object is controlled according to various events such as various input signals, and a method of controlling a mobile terminal.

2. Related Art

As hardware and software technologies in relation to various electronic devices including mobile terminals have been remarkably developed, various electronic devices providing a function of displaying a stereoscopic graphic object using binocular parallax become prevalent.

Thus, various functions and user interfaces capable of effectively controlling a stereoscopic graphic object and providing user convenience are required to be supported.

SUMMARY

An aspect of the present invention provides a mobile terminal in which a depth level of a stereoscopic graphic object using binocular parallax is controlled according to a usage pattern of a user, and a method of controlling a mobile terminal.

Another aspect of the present invention provides a mobile terminal in which displaying of a stereoscopic graphic object is controlled according to various events such as various input signals, and a method of controlling a mobile terminal.

According to an aspect of the present invention, there is provided a mobile terminal including: a touch screen having a panel for implementing stereoscopic vision; and a controller configured to differently control three-dimensional (3D) display characteristics of a plurality of stereoscopic graphic objects which correspond to a plurality of items, respectively, and use binocular parallax according to a user's usage patterns with respect to the plurality of items in displaying the plurality of stereoscopic graphic objects on the touch screen, wherein the 3D display characteristics include at least one of a depth level, a slope, and shade of a stereoscopic graphic object, and the slope includes at least one of an angle at which the stereoscopic graphic object tilts and a direction of the stereoscopic graphic object.

According to another aspect of the present invention, there is provided a method of controlling a mobile terminal including a touch screen having a panel for implementing stereoscopic vision, including: obtaining a user's usage patterns with respect to a plurality of items; and when a plurality of stereoscopic graphic objects which correspond to the plurality of items, respectively, and use binocular parallax are displayed on the touch screen, differently controlling three-dimensional (3D) display characteristics of the plurality of stereoscopic graphic objects according to the obtained user's usage patterns.

According to embodiments of the present invention, the following advantages can be obtained.

According to an embodiment of the present invention, since a depth level of a stereoscopic graphic object using binocular parallax is controlled according to a usage pattern of a user, the user can conveniently, effectively access the stereoscopic graphic object.

Also, according to an embodiment of the present invention, since displaying of a stereoscopic graphic object is controlled according to various events such as various input signals, user's visibility of the stereoscopic graphic object can be obtained, reluctance or objection to the user's stereoscopic graphic object can be offset (removed) and the user can effectively use the stereoscopic graphic object.

BRIEF DESCRIPTION OF THE DRAWINGS

The above and other objects and features of the present invention will become apparent from the following description of preferred embodiments given in conjunction with the accompanying drawings, in which:

FIGS. 12 to 28 are views explaining the method of controlling a mobile terminal according to the second embodiment of the present invention.

DETAILED DESCRIPTION OF THE EMBODIMENTS

The foregoing and other objects, features, aspects and advantages of the present invention will be described in detail in conjunction with the accompanying drawings, and accordingly, a person skilled in the art to which the present invention pertains will easily implement the technical concept of the present invention. In describing the present invention, if a detailed explanation for a related known function or construction is considered to unnecessarily divert the gist of the present invention, such explanation will be omitted but would be understood by those skilled in the art.

The mobile terminal related to an embodiment of the present invention will be described in detail with reference to the accompanying drawings. In the following description, usage of suffixes such as 'module', 'part' or 'unit' used for referring to elements is given merely to facilitate explanation of the present invention, without having any significant meaning by itself.

Mobile terminals described in the present disclosure may include mobile phones, smart phones, notebook computers, digital broadcast receivers, PDAs (Personal Digital Assistants), PMPs (Portable Multimedia Player), navigation devices, and the like.

Figure 1:
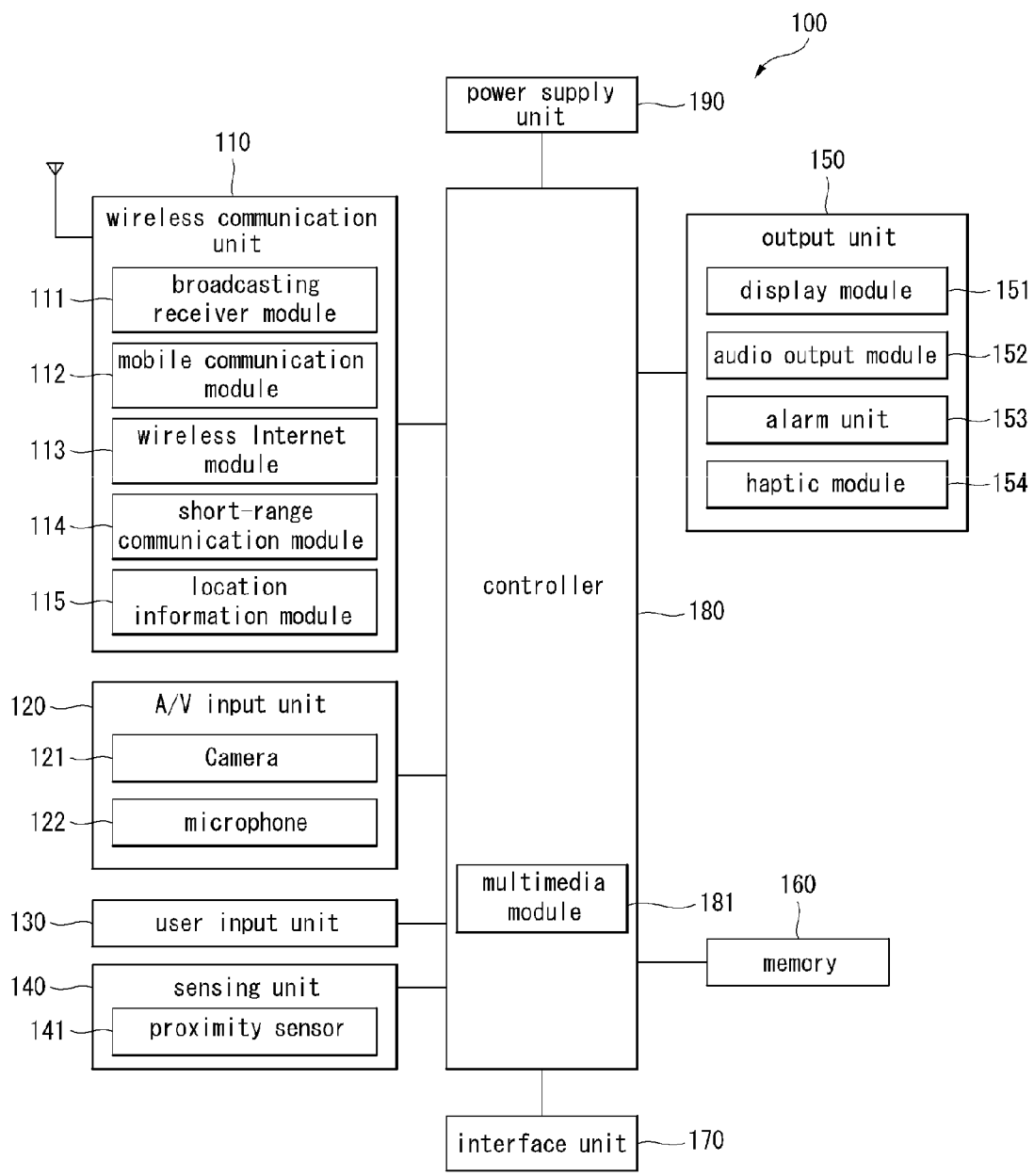
FIG. 1 is a schematic block diagram of a mobile terminal in relation to an embodiment of the present invention.

FIG. 1 is a block diagram of a mobile terminal in relation to an embodiment of the present invention.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented.

The elements of the mobile terminal will be described in detail as follows.

The wireless communication unit 110 typically includes one or more modules allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

In addition, the broadcast associated information may refer to information associated with a broadcast channel, a broadcast program or a broadcast service provider. The broadcast associated information may also be provided via a mobile communication network and, in this instance, the broadcast associated information may be received by the mobile communication module 112.

Further, the broadcast signal may exist in various forms. For example, the broadcast signal may exist in the form of an electronic program guide (EPG) of the digital multimedia broadcasting (DMB) system, and electronic service guide (ESG) of the digital video broadcast-handheld (DVB-H) system, and the like.

The broadcast receiving module 111 may also be configured to receive signals broadcast by using various types of broadcast systems. In particular, the broadcast receiving module 111 can receive a digital broadcast using a digital broadcast system such as the multimedia broadcasting-terrestrial (DMB-T) system, the digital multimedia broadcasting-satellite (DMB-S) system, the digital video broadcast-handheld (DVB-H) system, the data broadcasting system known as the media forward link only (MediaFLO®), the integrated services digital broadcast-terrestrial (ISDB-T) system, etc. The broadcast receiving module 111 can also be configured to be suitable for all broadcast systems that provide a broadcast signal as well as the above-mentioned digital broadcast systems.

In addition, the broadcast signals and/or broadcast-associated information received via the broadcast receiving module 111 may be stored in the memory 160.

In addition, the mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile terminal and may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

Further, the short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location or position of the mobile terminal. The location information module 115 may acquire location information by using a global navigation satellite system (GNSS). Here, the GNSS is a standard generic term for satellite navigation systems revolving around the earth and allowing certain types of radio navigation receivers to transmit reference signals determining their location on or in the vicinity of the surface of the earth. The GNSS may include the United States' global positioning system (GPS), the European Union's Galileo positioning system, the Russian global orbiting navigational satellite system (GLONASS), COMPASS, a compass navigation system, by the People's Republic of China, and the quasi-zenith satellite system (QZSS) by Japan.

An example of GNSS is a GPS (Global Positioning System) module. The GPS module may calculate information related to the distance from one point (entity) to three or more satellites and information related to time at which the distance information was measured, and applies trigonometry to the calculated distance, thereby calculating three-dimensional location information according to latitude, longitude, and altitude with respect to the one point (entity). In addition, a method of acquiring location and time information by using three satellites and correcting an error of the calculated location and time information by using another one satellite may be also used. The GPS module may also continuously calculate the current location in real time and also calculate speed information by using the continuously calculated current location.

With reference to FIG. 1, the A/V input unit 120 is configured to receive an audio or video signal, and includes a camera 121 and a microphone 122. The camera 121 processes image data of still pictures or video obtained by an image capture device in a video capturing mode or an image capturing mode, and the processed image frames can then be displayed on a display unit 151.

The image frames processed by the camera 121 may be stored in the memory 160 or transmitted via the wireless communication unit 110. Two or more cameras 121 may also be provided according to the configuration of the mobile terminal.

The microphone 122 can receive sounds via a microphone in a phone call mode, a recording mode, a voice recognition mode, and the like, and can process such sounds into audio data. The processed audio data may then be converted for output into a format transmittable to a mobile communication base station via the mobile communication module 112 for the phone call mode. The microphone 122 may also implement various types of noise canceling (or suppression) algorithms to cancel or suppress noise or interference generated when receiving and transmitting audio signals.

The user input unit 130 can generate input data from commands entered by a user to control various operations of the mobile terminal. The user input unit 130 may include a keypad, a dome switch, a touch pad (e.g., a touch sensitive member that detects changes in resistance, pressure, capacitance, etc. due to being contacted), a jog wheel, a jog switch, and the like.

The sensing unit 140 detects a current status of the mobile terminal 100 such as an opened or closed state of the mobile terminal 100, a location of the mobile terminal 100, the presence or absence of user contact with the mobile terminal 100, the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. Meanwhile, the sensing unit 140 may include a proximity sensor 141.

The output unit 150 is configured to provide outputs in a visual, audible, and/or tactile manner. In the example in FIG. 1, the output unit 150 includes the display unit 151, an audio output module 152, an alarm unit 153, a haptic module 154, and the like.

The display unit 151 can display information processed in the mobile terminal 100. For example, when the mobile terminal 100 is in a phone call mode, the display unit 151 can display a User Interface (UI) or a Graphic User Interface (GUI) associated with a call or other communication.

The display unit 151 may also include at least one of a Liquid Crystal Display (LCD), a Thin Film Transistor-LCD (TFT-LCD), an Organic Light Emitting Diode (OLED) display, a flexible display, a three-dimensional (3D) display, or the like. Some of these displays may also be configured to be transparent or light-transmissive to allow for viewing of the exterior, which is called transparent displays.

An example transparent display is a TOLED (Transparent Organic Light Emitting Diode) display, or the like. A rear structure of the display unit 151 may be also light-transmissive. Through such configuration, the user can view an object positioned at the rear side of the terminal body through the region occupied by the display unit 151 of the terminal body.

Further, the mobile terminal 100 may include two or more display units according to its particular desired embodiment. For example, a plurality of display units may be separately or integrally disposed on one surface of the mobile terminal, or may be separately disposed on mutually different surfaces.

Meanwhile, when the display unit 151 and a sensor (referred to as a 'touch screen', hereinafter) for detecting a touch operation are overlaid in a layered manner to form a touch screen, the display unit 151 can function as both an input device and an output device. The touch sensor may have a form of a touch film, a touch sheet, a touch pad, and the like.

Further, the touch sensor may be configured to convert pressure applied to a particular portion of the display unit 151 or a change in the capacitance or the like generated at a particular portion of the display unit 151 into an electrical input signal. The touch sensor may also be configured to detect the pressure when a touch is applied, as well as the touched position and area.

When there is a touch input with respect to the touch sensor, corresponding signals are transmitted to a touch controller, and the touch controller processes the signals and transmits corresponding data to the controller 180. Accordingly, the controller 180 can recognize which portion of the display unit 151 has been touched.

With reference to FIG. 1, the proximity sensor 141 may be disposed within or near the touch screen. In more detail, the proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and can be utilized for various purposes.

Examples of the proximity sensor 141 include a transmission type photoelectric sensor, a direct reflection type photoelectric sensor, a mirror-reflection type photo sensor, an RF oscillation type proximity sensor, a capacitance type proximity sensor, a magnetic proximity sensor, an infrared proximity sensor, and the like.

When the touch screen is the capacitance type, proximity of the pointer is detected by a change in electric field according to the proximity of the pointer. In this instance, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. Further, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be output to the touch screen.

The audio output module 152 can convert and output as sound audio data received from the wireless communication unit 110 or stored in the memory 160 in a call signal reception mode, a call mode, a record mode, a voice recognition mode, a broadcast reception mode, and the like. Also, the audio output module 152 can provide audible outputs related to a particular function performed by the mobile terminal 100 (e.g., a call signal reception sound, a message reception sound, etc.). The audio output module 152 may also include a speaker, a buzzer, or the like. In addition, the audio output module 152 may output a sound through an earphone jack. The user may connect an earphone to the earphone jack to listen to an output sound.

The alarm unit 153 can output information about the occurrence of an event of the mobile terminal 100. Typical events include call reception, message reception, key signal inputs, a touch input etc. In addition to audio or video outputs, the alarm unit 153 can provide outputs in a different manner to inform about the occurrence of an event. For example, the alarm unit 153 can provide an output in the form of vibrations. The video signal or the audio signal may be also output through the display unit 151 or the audio output module 152.

The haptic module 154 generates various tactile effects the user may feel. One example of the tactile effects generated by the haptic module 154 is vibration. The strength and pattern of the haptic module 154 can also be controlled. For example, different vibrations may be combined to be output or sequentially output.

Besides vibration, the haptic module 154 can generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may also be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 can store software programs used for the processing and controlling operations performed by the controller 180, or temporarily store data (e.g., a phonebook, messages, still images, video, etc.) that are input or output. In addition, the memory 160 may store data regarding various patterns of vibrations and audio signals output when a touch is input to the touch screen.

The memory 160 may also include at least one type of storage medium including a flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with external devices connected with the mobile terminal 100. For example, the external devices can transmit data to an external device, receive and transmit power to each element of the mobile terminal 100, or transmit internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may also be a chip that stores various types of information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device can be connected with the mobile terminal 100 via a port.

When the mobile terminal 100 is connected with an external cradle, the interface unit 170 can also serve as a passage to allow power from the cradle to be supplied therethrough to the mobile terminal 100 or serve as a passage to allow various command signals input by the user from the cradle to be transferred to the mobile terminal therethrough. Various command signals or power input from the cradle may operate as signals for recognizing that the mobile terminal is properly mounted on the cradle.

The controller 180 controls the general operations of the mobile terminal. For example, the controller 180 performs controlling and processing associated with voice calls, data communications, video calls, and the like. In the example in FIG. 1, the controller 180 also includes a multimedia module 181 for reproducing multimedia data. The multimedia module 181 may be configured within the controller 180 or may be configured to be separated from the controller 180.

The controller 180 can also perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For a software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Figure 2:
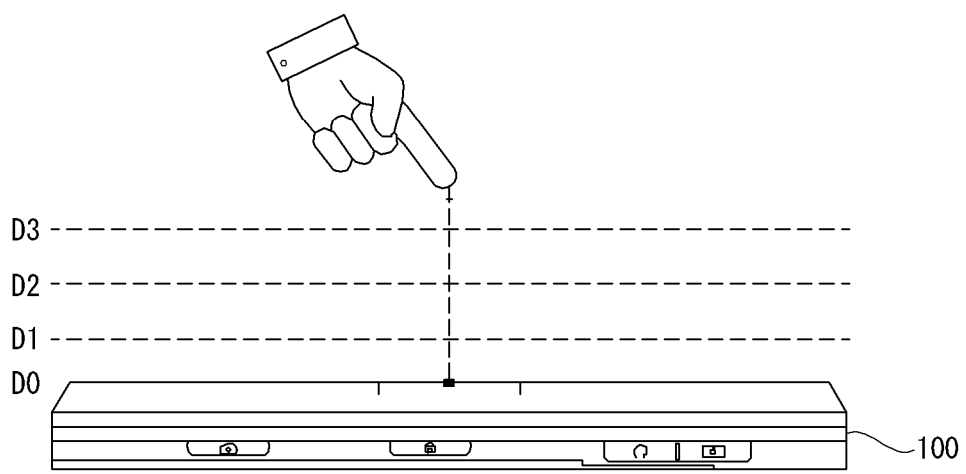
FIG. 2 is a conceptual view explaining a proximity depth of a proximity sensor.

FIG. 2 is a conceptual view illustrating a proximity depth of the proximity sensor 141.

As shown in FIG. 2, when a pointer such as the user's finger, a pen, or the like, approaches the touch screen, the proximity sensor 141 disposed within or near the touch screen detects it and outputs a proximity signal.

The proximity sensor 141 may also be configured to output a different proximity signal according to the distance (referred to as a 'proximity depth', hereinafter) between the closely touched pointer and the touch screen.

A distance at which a proximity signal is output when a pointer approaches the touch screen is a detection distance. In brief, a plurality of proximity sensors each having a different detection distance may be used and proximity signals output from the respective proximity sensors may be compared to obtain the proximity depth.

FIG. 2 also shows the section of the touch screen with the proximity sensor 141 for detecting, for example, three proximity depths. The proximity sensor 141 may detect three or less or four or more proximity depths.

In more detail, when the pointer is fully brought into contact with the touch screen d0, this position is recognized as a contact touch. When the pointer is positioned to be spaced apart by shorter than a distance d1 on the touch screen, this position is recognized as a proximity touch with a first proximity depth.

If the pointer is positioned to be spaced apart by the distance longer than the distance d1 but shorter than a distance d2 on the touch screen, this position is recognized as a proximity touch with a second proximity depth. Also, if the pointer is positioned to be spaced apart by the distance longer than the distance d2 but shorter than a distance d3, this position is recognized as a proximity touch with a third proximity depth. If the pointer is positioned to be spaced apart by longer than the distance d3 on the touch screen, this position is recognized that the proximity touch has been released.

Accordingly, the controller 180 can recognize the proximity touches as various input signals according to the proximity depths and proximity positions of the pointer, and control various operations according to the various input signals.

Figure 3:
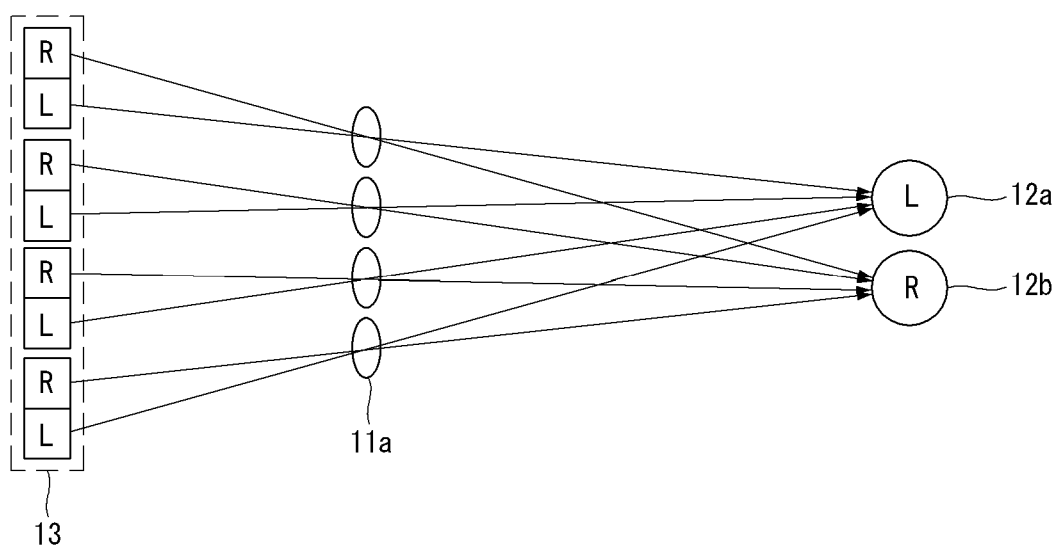
FIGS. 3 and 4 are views explaining a method of displaying a stereoscopic image using binocular parallax in relation to embodiments of the present invention.
Figure 4:
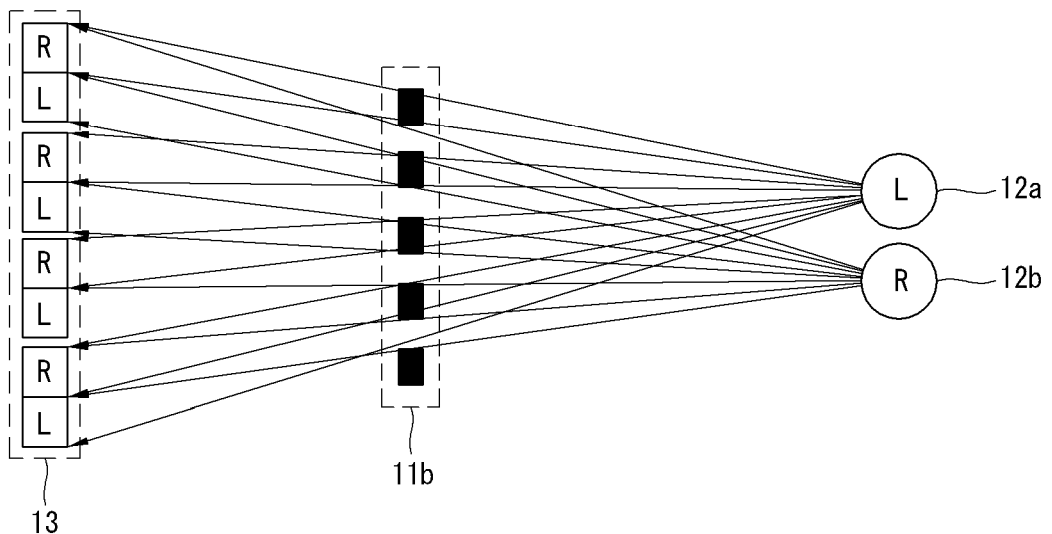

FIGS. 3 and 4 are views explaining a method of displaying a stereoscopic image using binocular parallax in relation to embodiments of the present invention. Specifically, FIG. 3 shows a scheme of using a lenticular lens array, and FIG. 4 shows a scheme of using parallax barrier.

Binocular parallax (or stereo disparity) refers to a difference between visions of a human's left eye and a right eye viewing an object. When an image viewed by the left eye and that viewed by the right eye are combined in the human's brain, the combined image makes the human feel a stereoscopic sense. Hereinafter, the phenomenon in which the human feels a stereoscopic sense according to the binocular parallax will be referred to as a 'stereoscopic vision' and an image providing the stereoscopic vision will be referred to as a 'stereoscopic image'. Also, when a particular object included in an image provides the stereoscopic vision, the corresponding object will be referred to as a 'stereoscopic object'.

A method for displaying a stereoscopic image according to binocular parallax is divided into a glass type scheme requiring special glasses and a glassless type scheme not requiring glasses. The glass type scheme includes a scheme using colored glasses having wavelength selectivity, a polarized glass scheme using light shielding effect according to a polarization difference, a time-division glass scheme alternately presenting left and right images within a residual image time of the eyes, and the like. Besides, there is also a scheme in which filters, each having different transmittance, are mounted in left and right eyes to obtain a stereoscopic sense with respect to a movement in a horizontal direction according a time difference of a visual system caused by the difference in the transmittance.

The glassless scheme in which a stereoscopic sense is generated from an image display plane, rather than from an observer, includes a parallax barrier scheme, a lenticular lens scheme, a microlens array scheme, and the like, With reference to FIG. 3, the display module 151 includes a lenticular lens array 11a. The lenticular lens array 11a is positioned between a display plane 13 on which pixels L to be input to the left eye 12a and pixels R to be input to the right eye 12b are alternately arranged in a horizontal direction and the left and right eyes 12a and 12b, and provides optical discrimination directivity with respect to the pixels L to be input to the left eye 12a and the pixels R to be input to the right eye 12b. Accordingly, an image, which has passed through the lenticular lens array 11a, is separately observed by the left eye 12a and the right eye 12b, and the human's brain combines the image viewed through the left eye 12a and the image viewed through the right eye 12b to view a stereoscopic image.

With reference to FIG. 4, in order to display a stereoscopic image, the display module 151 includes a parallax barrier 81b having a vertical lattice shape. The parallax barrier 11b is positioned between the display plane 13 on which the pixels L to be input to the left eye 12a and the pixels R to be input to the right eye 12b are alternately arranged in the horizontal direction and the left and right eyes 12a and 12b. An image is separately observed by the left eye 12a and the right eye 12b through the aperture having a vertical lattice shape of the parallax barrier 11b. Thus, the human's brain combines the image viewed through the left eye 12a and the image viewed through the right eye 12b to view a stereoscopic image. The parallax barrier 11b is turned on only when a stereoscopic image is desired to be displayed, to separate an incident vision.

Meanwhile, the foregoing stereoscopic image display methods are used to explain embodiments of the present invention and the present invention is not limited thereto. Besides the foregoing methods, the present invention is able to display a stereoscopic image using binocular parallax by using various other methods.

Figure 5:
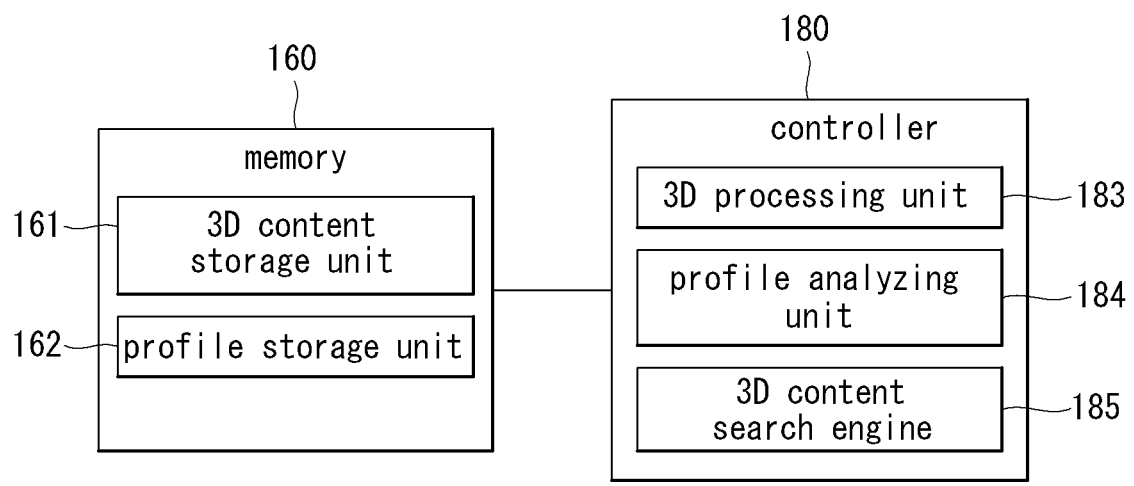
FIG. 5 is a view explaining additional elements of the mobile terminal in relation to embodiments of the present invention.

FIG. 5 is a view explaining additional elements of the mobile terminal 100 in relation to embodiments of the present invention.

The elements of the mobile terminal 100 in relation to an embodiment of the present invention will be described in more detail with reference to FIGS. 4 and 5.

With reference to FIG. 5, the memory 160 may include a 3D content storage unit 161 and a profile storage unit 162.

The 3D content storage unit 161 stores various 3D content such as an icon, a widget, an image, text, video, a certain item, and the like. The icon or the widget may have a corresponding application, respectively.

The profile storage unit 162 stores user's usage patterns with respect to various items that can be accessed by the user. The usage patterns may include, for example, the frequency of use, usage recency, whether a bookmark has been set, whether or not a stereoscopic graphic object is currently activated, and the like.

The frequency of use with respect to a particular item refers to the number of times or frequency of accessing or using the particular item by the user. Also, the usage recency with respect to a particular item refers to a timing at which the user has accessed or used the particular item, or a user's relative access (or use) timing with respect to the particular item over an access (or use) timing of a different item.

Also, with reference to FIG. 5, the controller 180 may include a 3D processing unit 183, a profile analyzing unit 184, and a 3D content search engine 185. The 3D processing unit 183, the profile analyzing unit 184, and the 3D content search engine 185 may be implemented as modules separated from the controller 180.

The 3D processing unit 183 processes various types of information to display a stereoscopic image on the display unit 151.

The profile analyzing unit 184 analyzes user's access or usage patterns with respect to various items, and stores the analysis results in the profile storage unit 162.

The 3D content search engine 185 may perform a function of searching only 3D content from among a plurality of contents stored in the memory 160 or a plurality of contents displayed on the display unit 151.

Figure 6:
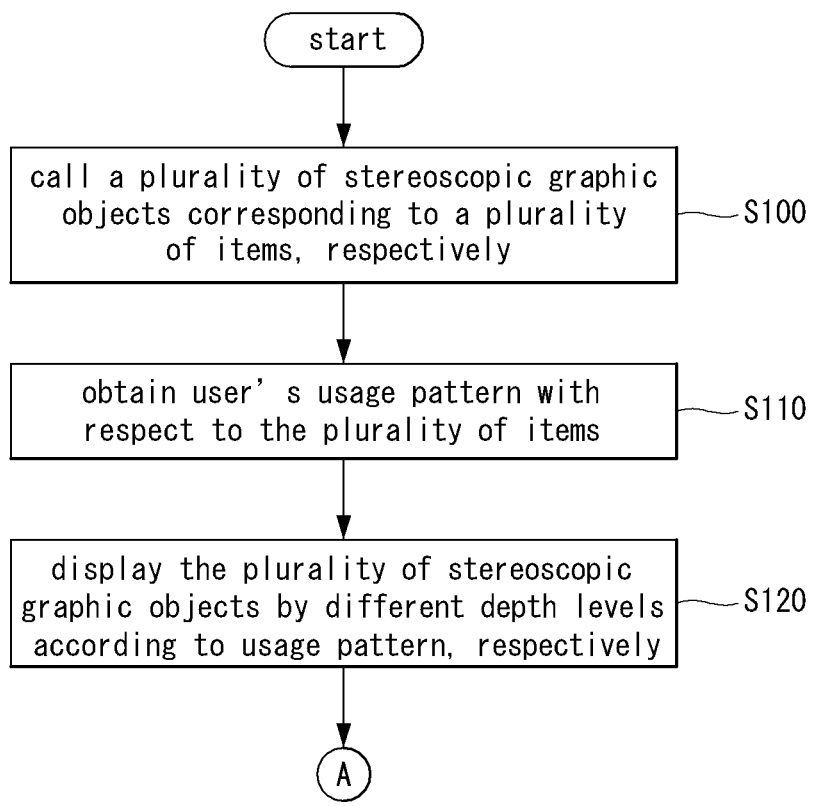
FIG. 6 is a flow chart illustrating a process of a method of controlling a mobile terminal according to a first embodiment of the present invention.

FIG. 6 is a flow chart illustrating a process of a method of controlling a mobile terminal according to a first embodiment of the present invention. FIGS. 7 to 10 are views explaining the method of controlling a mobile terminal according to the first embodiment of the present invention.

The method of controlling a mobile terminal according to a first embodiment of the present invention may be implemented in the mobile terminal 100 described above with reference to FIGS. 1 to 5. Hereinafter, the method of controlling a mobile terminal according to the first embodiment of the present invention and the operation of the mobile terminal 100 for implementing the same will now be described in detail with reference to the relevant drawings.

With reference to FIG. 6, the controller 180 may call a plurality of stereoscopic graphic objects corresponding to a plurality of items, respectively (S100).

The stereoscopic graphic objects refer to a stereoscopic image using stereo disparity (or binocular parallax).

Figure 7:
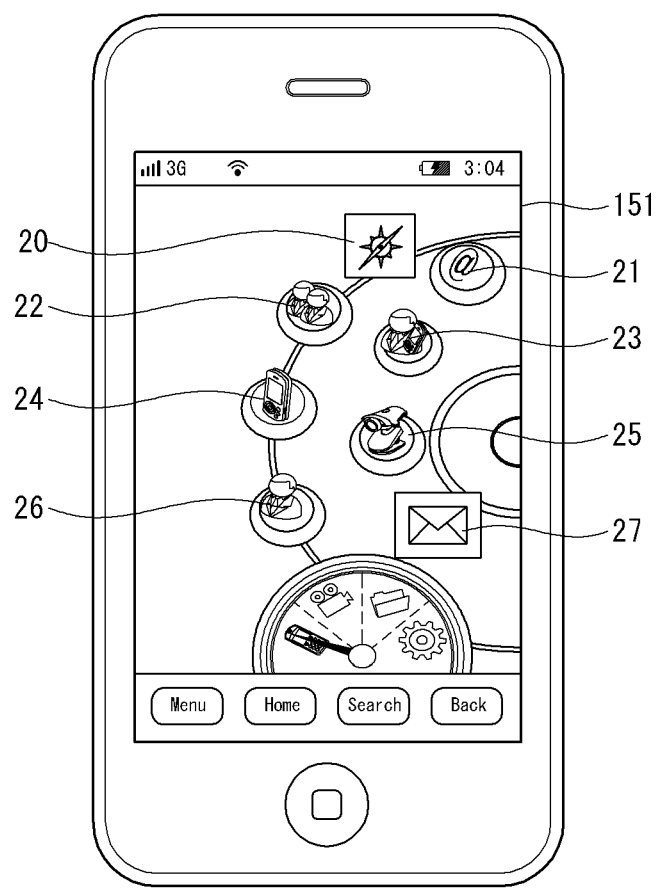
FIGS. 7 to 10 are views explaining the method of controlling a mobile terminal according to the first embodiment of the present invention.

For example, with reference to FIG. 7, when an idle screen (or a background screen) is provided to the display unit 151, the controller 180 may call a plurality of stereoscopic graphic objects 20, 21, 22, 23, 24, 25, 26, and 27 corresponding to a plurality of items set to be displayed on the idle screen (or the background screen), respectively, from the 3D content storage unit 161.

For example, the plurality of stereoscopic graphic objects 20, 21, 22, 23, 24, 25, 26, and 27 may correspond to a Web browser for an Internet access, an e-mail client, a phone book, a call list, a phone call application, a video call application, a mobile client center access application, and a message application, respectively.

Namely, the Web browser for an Internet access, the e-mail client, the phone book, the call list, the phone call application, the video call application, the mobile client center access application, and the message application are a plurality of items corresponding to the plurality of stereoscopic graphic objects 20, 21, 22, 23, 24, 25, 26, and 27, respectively.

The controller 180 may obtain user's usage patterns with respect to the plurality of items (S110).

For example, the controller 180 may call the respective usage patterns with respect to the plurality of items from the profile storage unit 162.

The controller 180 may display the plurality of stereoscopic graphic objects by different depth levels according to the usage patterns (S120).

In the present disclosure, an embodiment in which the depth levels are controlled according to usage patterns is largely described, but the present invention is not limited thereto.

The depth levels may be extended to 3D display characteristics of stereoscopic graphic objects.

For example, the controller 180 may differently control the 3D display characteristics of the plurality of stereoscopic graphic objects according to the usage patterns.

The 3D display characteristics may include at least one of a depth level, a slope, and shade of a stereoscopic graphic object.

Here, the tilt may include an angle at which the stereoscopic graphic object tilts and a direction of the stereoscopic graphic object.

For example, the controller 180 may differently display the depth levels of the plurality of stereoscopic graphic objects corresponding to the plurality of items in consideration of the frequency of use of each of the plurality of items.

Figure 8:
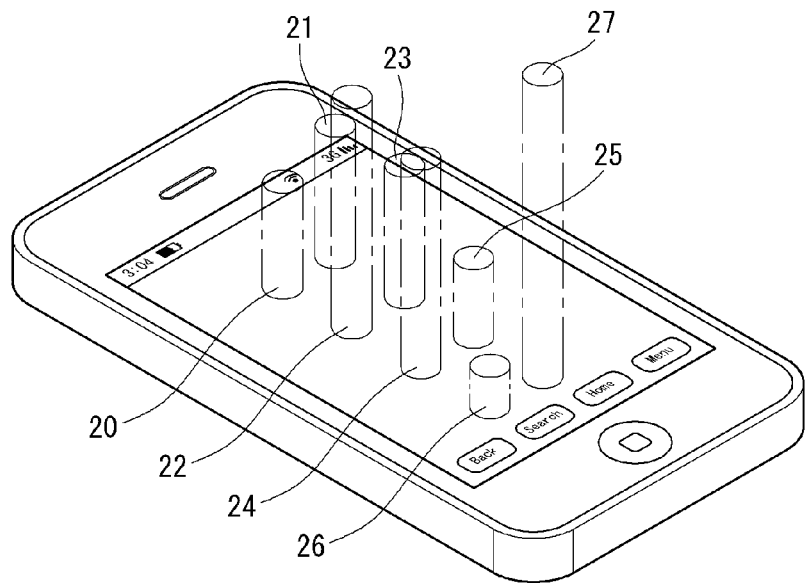

FIG. 8 is a perspective view of the screen illustrated in FIG. 7. The plurality of stereoscopic graphic objects 20, 21, 22, 23, 24, 25, 26, and 27 illustrated in FIGS. 7 and 8 constitutes a 3D image using binocular parallax, so they have a depth level, respectively.

That the plurality of stereoscopic graphic objects 20, 21, 22, 23, 24, 25, 26, and 27 have depth levels means that the plurality of stereoscopic graphic objects 20, 21, 22, 23, 24, 25, 26, and 27 displayed on the display unit 151 are seen to advance from the display unit 151 or recede into the display unit 151 by the user.

FIG. 8 shows a case in which the plurality of stereoscopic graphic objects 20, 21, 22, 23, 24, 25, 26, and 27 are seen to advance by the user.

As shown in FIG. 8, the plurality of stereoscopic graphic objects 20, 21, 22, 23, 24, 25, 26, and 27 may have different depth levels according to the user's usage patterns.

That the plurality of stereoscopic graphic objects 20, 21, 22, 23, 24, 25, 26, and 27 have different levels does not mean that, among the plurality of stereoscopic graphic objects 20, 21, 22, 23, 24, 25, 26, and 27, two or more stereoscopic graphic objects having the same depth level do not exist.

Namely, the plurality of stereoscopic graphic objects 20, 21, 22, 23, 24, 25, 26, and 27 may have depth levels corresponding to the user's usage patterns.

Meanwhile, the depth levels corresponding to the user's usage patterns with respect to the particular stereoscopic graphic objects may be continuous or discrete in relation to the usage patterns.

Figure 9:
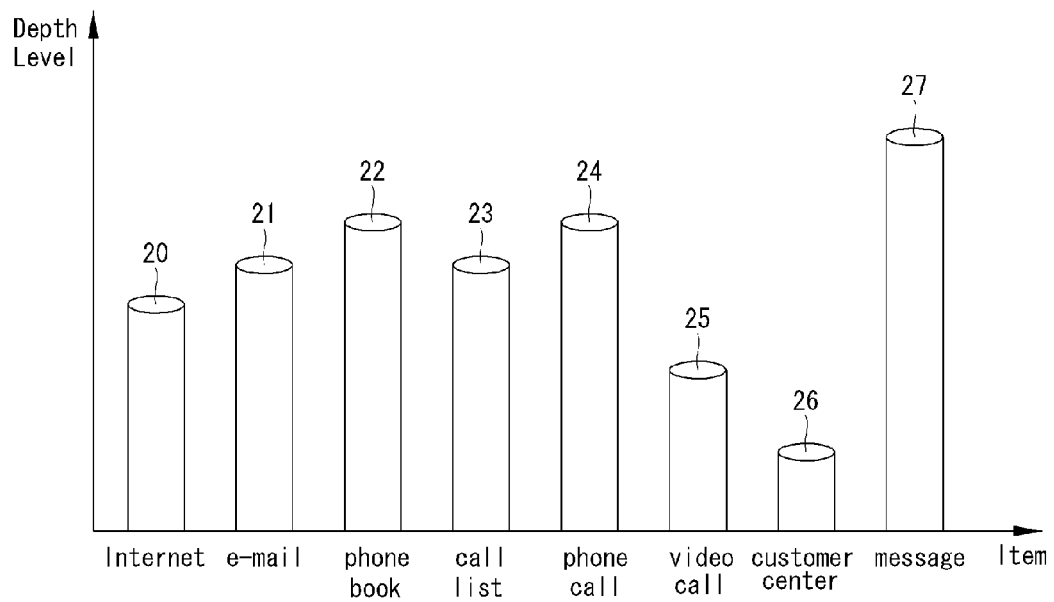
Figure 10:
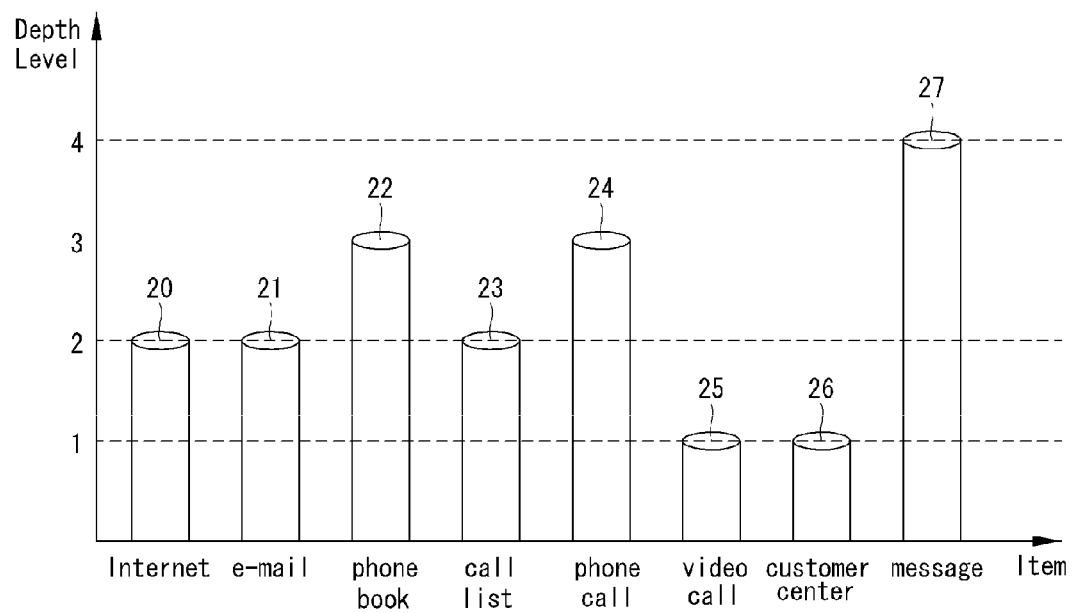

FIG. 9 shows a case in which the depth levels are shown to be continuous in relation to the usage patterns, and FIG. 10 shows a case in which the depth levels are shown to be discrete in relation to the usage patterns.

For example, with reference to FIG. 9, the controller 180 may control such that the depth levels of the plurality of stereoscopic graphic objects 20, 21, 22, 23, 24, 25, 26, and 27 have continuous values according to the usage patterns with respect to the plurality of stereoscopic graphic objects 20, 21, 22, 23, 24, 25, 26, and 27, respectively.

Also, for example, as shown in FIG. 10, the controller 180 may control such that the depth levels of the plurality of stereoscopic graphic objects 20, 21, 22, 23, 24, 25, 26, and 27 have discrete values according to the usage patterns with respect to the plurality of stereoscopic graphic objects 20, 21, 22, 23, 24, 25, 26, and 27, respectively.

For example, the stereoscopic graphic object 20 corresponding to the Internet and a stereoscopic graphic object 23 corresponding to the call list may have different depth levels as shown in FIG. 9 but may have the same depth level as shown in FIG. 10.

Figure 11:
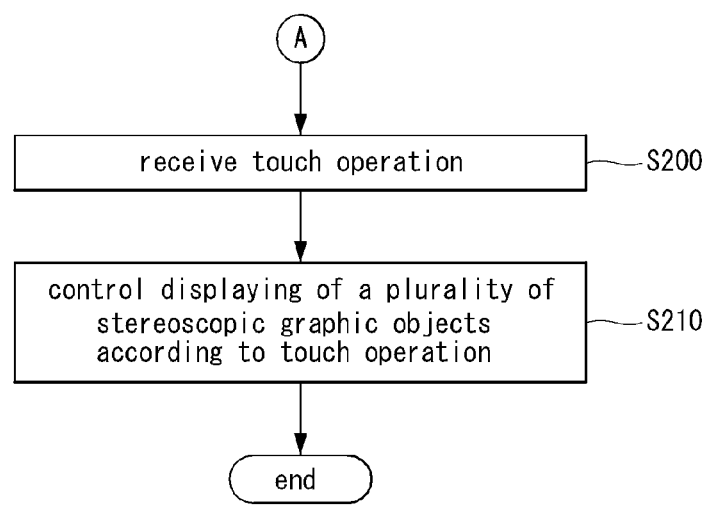
FIG. 11 is a flow chart illustrating a process of a method of controlling a mobile terminal according to a second embodiment of the present invention.

FIG. 11 is a flow chart illustrating a process of a method of controlling a mobile terminal according to a second embodiment of the present invention. FIGS. 12 to 28 are views explaining the method of controlling a mobile terminal according to the second embodiment of the present invention.

The method of controlling a mobile terminal according to the second embodiment of the present invention may be implemented in the mobile terminal 100 described above with reference to FIGS. 1 to 5. Hereinafter, the method of controlling a mobile terminal according to the second embodiment of the present invention and the operation of the mobile terminal 100 for implementing the same will now be described in detail with reference to the relevant drawings.

The method of controlling a mobile terminal according to the second embodiment of the present invention may be implemented based on the foregoing first embodiment of the present invention. Also, hereinafter, it is assumed that the display unit 151 is a touch screen.

With reference to FIG. 11, the controller 180 may receive a user's touch operation through the touch screen 151 (S200).

In the present disclosure, the touch operation will be largely described, but a technical concept of the present invention is not limited thereto.

For example, the touch operation in step S200 may be replaced by a 2D or 3D gesture input. The controller 180 may recognize the 2D or 3D gesture input by the proximity sensor 141 or by analyzing an image input through a camera 121.

The touch operation may include a direct touch and a proximity touch with respect to the touch screen 151.

In response to the received touch operation, the controller 180 may control displaying of the plurality of stereoscopic graphic objects displayed on the touch screen 151 (S210).

Step S210 may bring about searching, filtering, or extracting a plurality of stereoscopic graphic objects displayed on the touch screen 151 in response to the received touch operation, or at least one of the plurality of stereoscopic graphic objects called to be displayed on a current screen.

Hereinafter, various examples of searching, filtering, or extracting at least one of the plurality of stereoscopic graphic objects by controlling displaying of the plurality of stereoscopic graphic objects will be described through embodiments described with reference to FIGS. 12 to 28.

Figure 12:
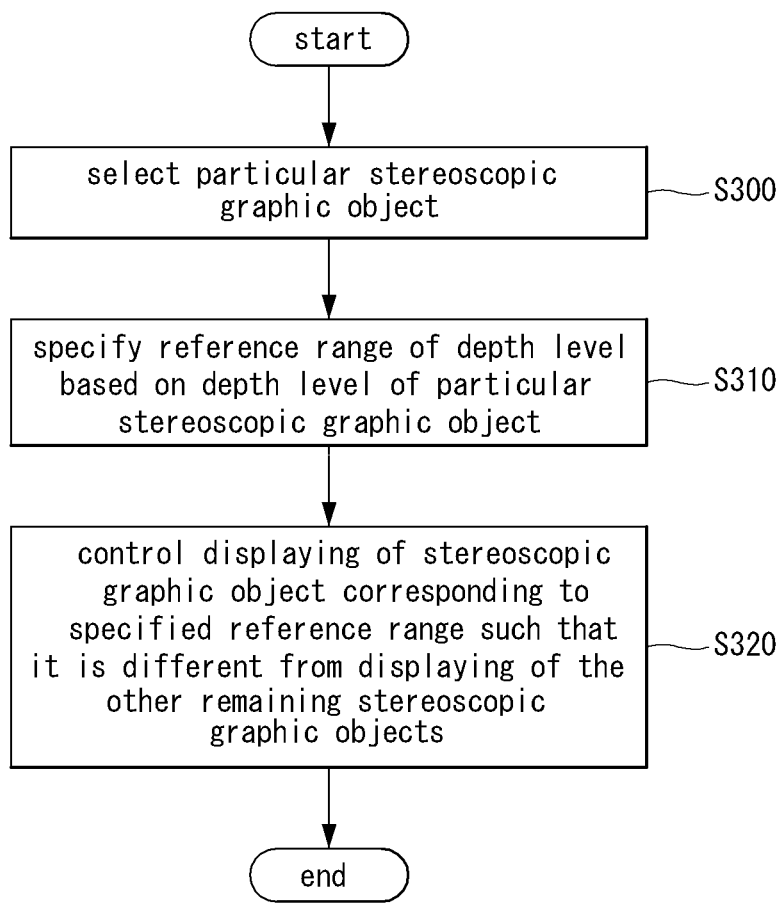
Figure 13:
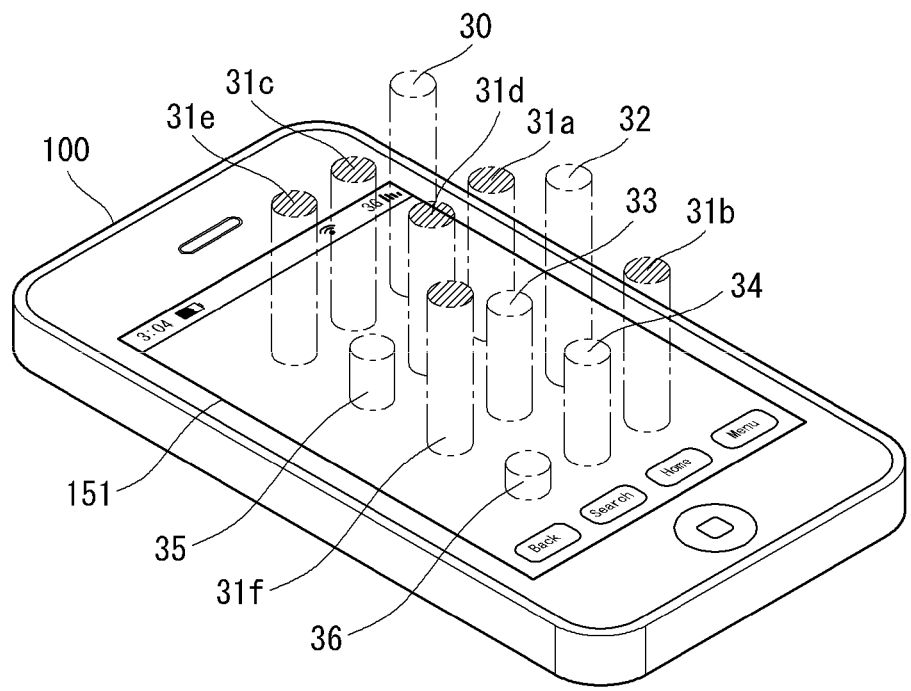

FIG. 12 is a specific embodiment of the method of controlling a mobile terminal illustrated in FIG. 11. FIG. 13 is a view showing an example of a screen for explaining the embodiment illustrated in FIG. 12.

With reference to FIG. 13, according to the foregoing first embodiment of the present invention, the controller 180 may display a plurality of stereoscopic graphic objects 30, 31a, 32, 31b, 31c, 31d, 33, 34, 31e, 35, 31f, and 36 on the touch screen 151 by different depth levels according to respective usage patterns.

With reference to FIG. 12, the controller 180 may receive a select signal with respect to a particular stereoscopic graphic object among the plurality of stereoscopic graphic objects displayed on the touch screen 151 (S300).

Figure 14:
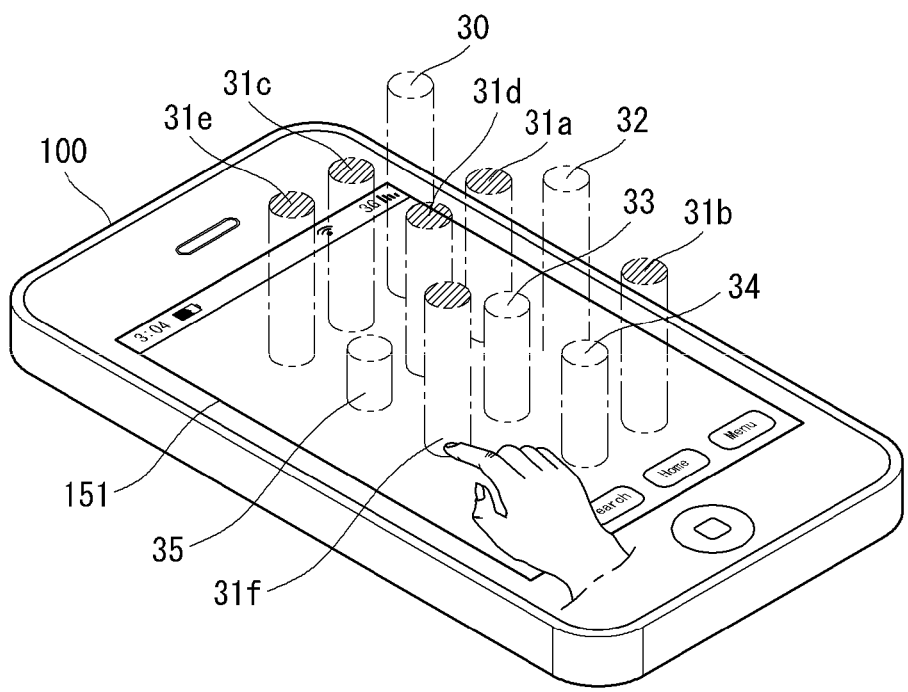

For example, when the user touches the particular stereoscopic graphic object with his finger, the particular stereoscopic graphic object may be selected. FIG. 14 illustrates an example in which the user selects a particular stereoscopic graphic object 31f.

The controller 180 may specify a reference range of a depth level based on the depth level of the selected particular stereoscopic graphic object (S310).

For example, the reference range of the depth level may be specified to be identical to the depth level of the particular stereoscopic graphic object 31f selected by the user in FIG. 14 within a margin of error (or an error range), may be specified to be lower than the depth level of the particular stereoscopic graphic object 31f, or may be specified to be higher than the depth level of the particular stereoscopic graphic object 31f.

The controller 180 may provide control to display the stereoscopic graphic object corresponding to the particular reference range among the plurality of stereoscopic graphic objects displayed on the touch screen 151 such that it is different from displaying of the other remaining stereoscopic graphic objects (S320).

Figure 15:
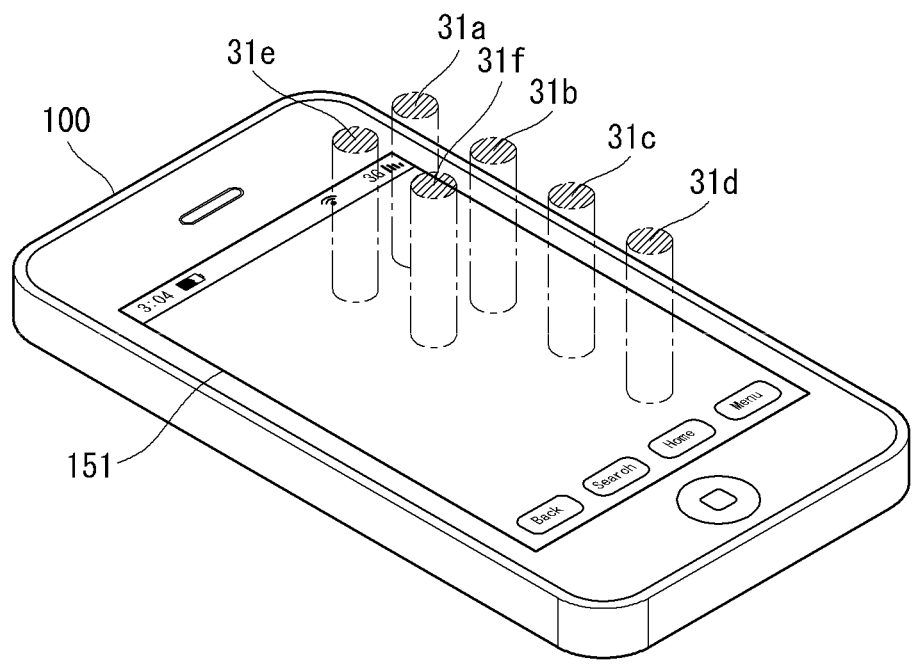

FIG. 15 illustrates an example in which all of the stereoscopic graphic objects having the same depth level as that of the stereoscopic graphic object 31f selected by the user in FIG. 14 within the margin of error are displayed.

For example, with reference to FIG. 15, the controller 180 may display all of the stereoscopic graphic objects 31a, 31b, 31c, 31d, 31e, 31f corresponding to the reference range (the same depth level as that of the stereoscopic graphic object 31f selected in FIG. 14 within the margin of error) specified in step S310 on the touch screen 151.

Meanwhile, in FIG. 13, at least one stereoscopic graphic object, which has been called but not displayed on the touch screen 151 due to the size of the screen in FIG. 13 may exist.

In this case, in performing step S320, the controller 180 may display the stereoscopic graphic object corresponding to the specified reference range among the other stereoscopic graphic objects not displayed in FIG. 13 on the touch screen 151.

Figure 16:
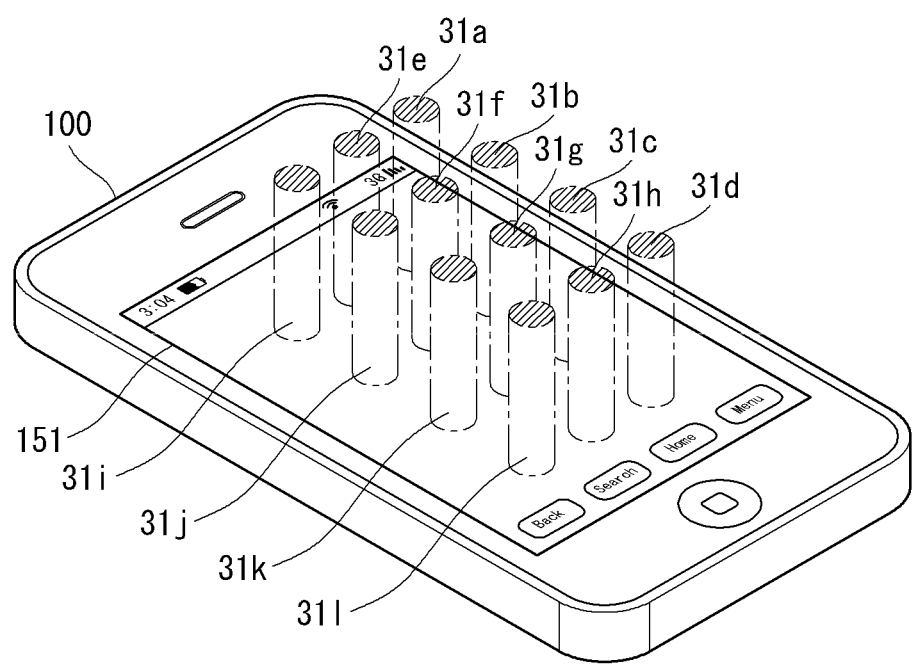

For example, some stereoscopic graphic objects 31g, 31h, 31i, 31j, 31k, 31l displayed in FIG. 16 are those which have been called but not displayed in FIG. 13 and have the same depth level as that of the selected stereoscopic graphic object 31f within the margin of error.

In this manner, as described above with reference to FIGS. 15 and 16, in performing step S320, the controller 180 may display only the stereoscopic graphic object corresponding to the specified reference range on the touch screen 151 and make the other remaining stereoscopic graphic objects disappear on the touch screen 151.

Also, in performing step S320, the controller 180 may control display characteristics of the stereoscopic graphic object corresponding to the specified reference range such that they are different from the display characteristics of the other remaining stereoscopic graphic objects.

Figure 17:
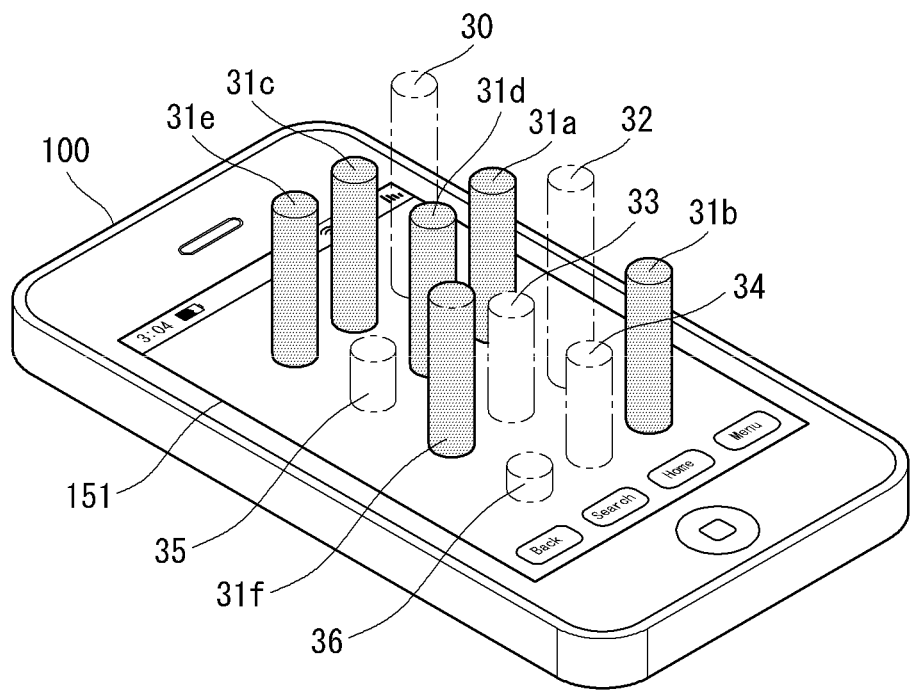

For example, with reference to FIG. 17, the controller 180 may highlight the stereoscopic graphic objects 31a, 31b, 31c, 31d, 31e, and 31f having the same depth level as that of the selected stereoscopic graphic object 31f selected in FIG. 14 within the margin of error, or may dimly display the other remaining stereoscopic graphic objects 30, 31, 32, 33, 34, 35, and 36.

Namely, the controller 180 may provide control to display the stereoscopic graphic objects 31*a*, 31*b*, 31*c*, 31*d*, 31*e*, and 31*f* having the same depth level as that of the selected stereoscopic graphic object 31*f* within the margin of error such that they are visually emphasized in comparison to the other remaining stereoscopic graphic objects 30, 31, 32, 33, 34, 35, and 36.

Figure 18:
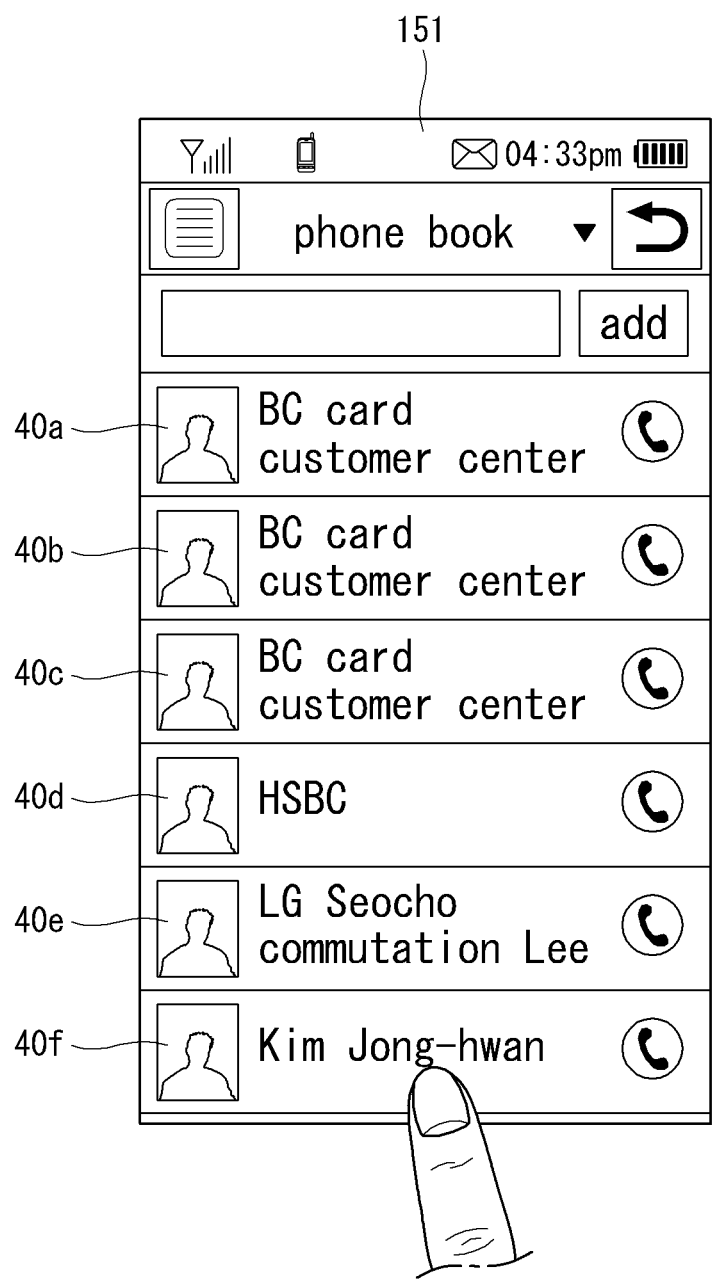
Figure 19A:
Figure 19B:
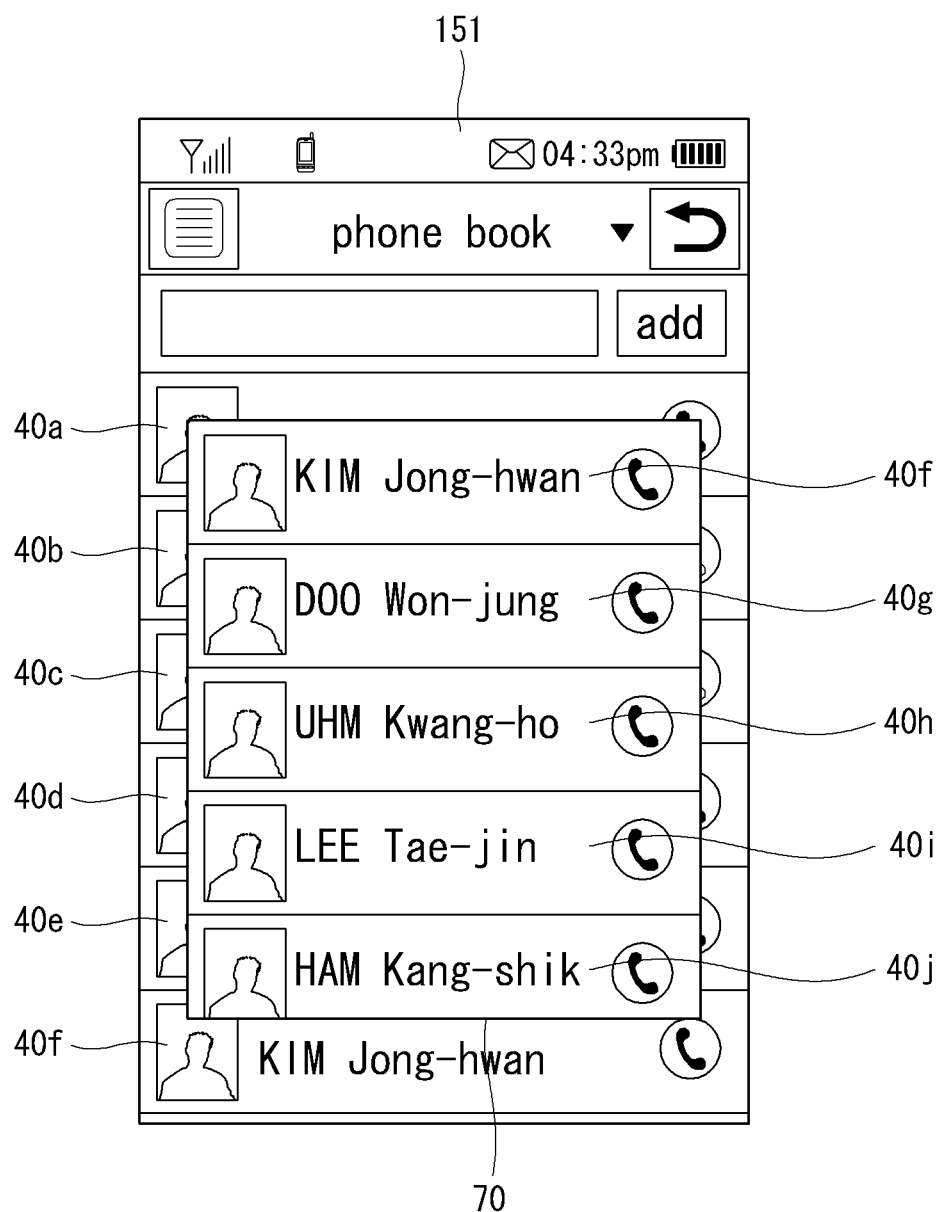

FIGS. 18, 19A, and 19B are views showing other embodiments implementing the method of controlling the mobile terminal illustrated in FIGS. 11 and 12.

For example, when a request for accessing the phone book 22 is received from the user in FIG. 7, the controller 180 may provide the screen illustrated in FIG. 18.

The screen illustrated in FIG. 18 includes a phone number list including a plurality of phone number items 40*a*, 40*b*, 40*c*, 40*d*, 40*e*, and 40*f*.

Meanwhile, it is assumed that the phone number items provided in FIGS. 18 and 19A are displayed as stereoscopic graphic objects using binocular parallax.

As shown in FIG. 18, the user may touch and select a particular phone number item 40*f* from among the phone number items 40*a*, 40*b*, 40*c*, 40*d*, 40*e*, and 40*f* displayed on the screen, or the user may shake the mobile terminal 100 in a state in which the particular phone number item 40*f* is selectively touched (S200, S300).

In response to the user's operation illustrated in FIG. 18, as shown in FIG. 19A, the controller 180 may specify the reference range based on the depth level of the selected particular phone number item 40*f* (S310), display only the plurality of phone number items 40*f*, 40*g*, 40*h*, 40*i*, and 40*j* having a depth level included in the specified reference range on the touch screen 151, and delete the other remaining phone number items not having the depth level included in the specified reference range from the touch screen 151 (S210, S320).

As described above, the plurality of phone number of items 40*f*, 40*g*, 40*h*, 40*i*, and 40*j* having the depth level included in the specified reference range may have the same depth level as that of the selected particular phone number item 40*f* within the margin of error, have the depth level lower than that of the selected particular phone number item 40*f* or may have the depth level higher than that of the selected particular phone number item 40*f*.

Meanwhile in FIG. 18, according to an aspect in which the particular phone number item 40*f* is selected, the category of the plurality of phone number items having the depth level included in the specified reference range may be changed.

The user may select the particular phone number item 40*f* according to a plurality of different touch methods.

For example, the user may select the particular phone number item 40*f* by flicking the particular phone number item 40*f* in an upward direction. When the particular phone number item 40*f* is selected upon being flicked in the upward direction, the controller 180 may display only the plurality of phone number items having the same depth level as that of the selected particular phone number item 40*f* within the margin of error on the touch screen 151.

Also, for example, the user may select the particular phone number item 40*f* by flicking the particular phone number item 40*f* in a downward direction. When the particular phone number item 40*f* is selected upon being flicked in the downward direction, the controller 180 may display only the plurality of phone number items having the depth level lower than that of the selected particular phone number item 40*f* (or having the depth level higher than that of the selected particular phone number item 40*f*) on the touch screen 151.

In the above description, the example in which the category of the plurality of searched (or filtered or extracted) phone number items are changed according to the direction of the flicking operation, but the technical concept of the present invention is not limited thereto.

For example, the category of a plurality of searched (or filtered or extracted) phone number items may be changed according to the range of the flicking operation.

Meanwhile, the search result screen is not limited to the example illustrated in FIG. 19*a*. FIG. 19*b* shows an example of a case in which the search result screen is provided as a pop-up window 70.

Meanwhile, according to the technical concept of the present invention, the plurality of phone number items 40*a*, 40*b*, 40*c*, 40*d*, 40*e*, and 40*f* included in the phone number list may also be displayed to have different depth levels according to the user's usage patterns.

For example, the depth levels may be displayed to be different according to the frequency of accessing the phone number items. A phone number item which is more frequently accessed by the user may be displayed to have a greater depth level.

Also, the sum of the access frequencies of the respective phone number items may be an access frequency with respect to the phone number list itself, and the depth level of the phone number list, i.e., the phone book 22, in FIGS. 7 and 8 may be determined by comparing the access frequency with respect to the phone number list and an access frequency with respect to other applications.

FIG. 20 is a view showing another embodiment implementing the method of controlling the mobile terminal illustrated in FIGS. 121 and 12.

For example, when an access request with respect to the message application 27 is received from the user, the controller 180 may provide the screen illustrated in FIG. 20(*a*).

The screen illustrated in FIG. 20(*a*) includes a reception message list including a plurality of reception messages 41*a*, 41*b*, 41*c*, and 41*d*.

Meanwhile, it is assumed that the messages provided in FIGS. 20(*a*) and 20(*b*) are displayed as a stereoscopic graphic object using binocular parallax.

As shown in FIG. 20(*a*), the user may touch to select the particular message 41*b* among the reception messages displayed on the screen or shake the mobile terminal 100 while he is touching to select the particular message 41*b* (S200, S300).

In response to the user's operation illustrated in FIG. 20(*a*), the controller 180 may specify the reference range based on the depth level of the selected particular message 41*b* (S310), display only a plurality of phone number items 41*b* and 41*e* having a depth level included in the specified reference range on the touch screen 151, and delete the other remaining messages not having the depth level included in the specified reference range from the touch screen 151 (S210, S320).

Meanwhile, when the particular message 41*b* is selected in FIG. 20(*a*), the controller 180 may display only messages (e.g., messages which have been received from a first counterpart or which have been transmitted to the first counterpart) related to the first counterpart that has transmitted the particular message 41 on the touch screen 151.

The reason is because the number of times of transmitting and receiving messages to and from the first counterpart and that of a different counterpart may be different. Namely, as shown in FIG. 20(*a*), when the number of times of transmitting and receiving messages to and from the first counterpart and the number of times of transmitting and receiving messages to and from a second counterpart (different from the first counterpart) are different, the controller 180 may display the depth level of the stereoscopic graphic objects indicating the messages related to the first counterpart and the depth level of the stereoscopic graphic objects indicating the messages related to the second counterpart such that they are different.

Meanwhile, in the embodiments described above with reference to FIGS. 11 and 12, it is described that the reference range of the depth level specified in step S310 is the same as that of the depth level of the particular item (or stereoscopic graphic object) selected in step S300 within the margin of error.

However, as mentioned above, the specified reference range may be greater than or lower than the depth level of the selected particular item (or stereoscopic graphic object).

Figure 21:
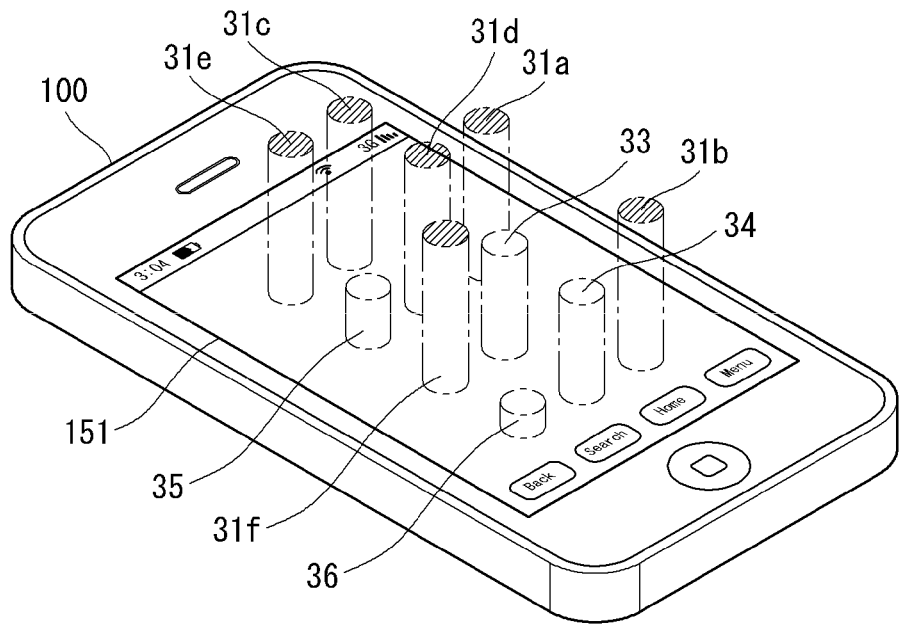

For example, with reference to FIG. 21, the controller 180 may display only the plurality of stereoscopic graphic objects having depth levels which is smaller than or equal to that of the particular stereoscopic graphic object 31*f* selected in FIG. 14 on the touch screen 151.

Also, for example, in FIG. 21, the controller 180 may display only a plurality of stereoscopic graphic objects having depth levels smaller than that of the particular stereoscopic graphic object 31*f* selected in FIG. 14 on the touch screen 151.

Figure 22:
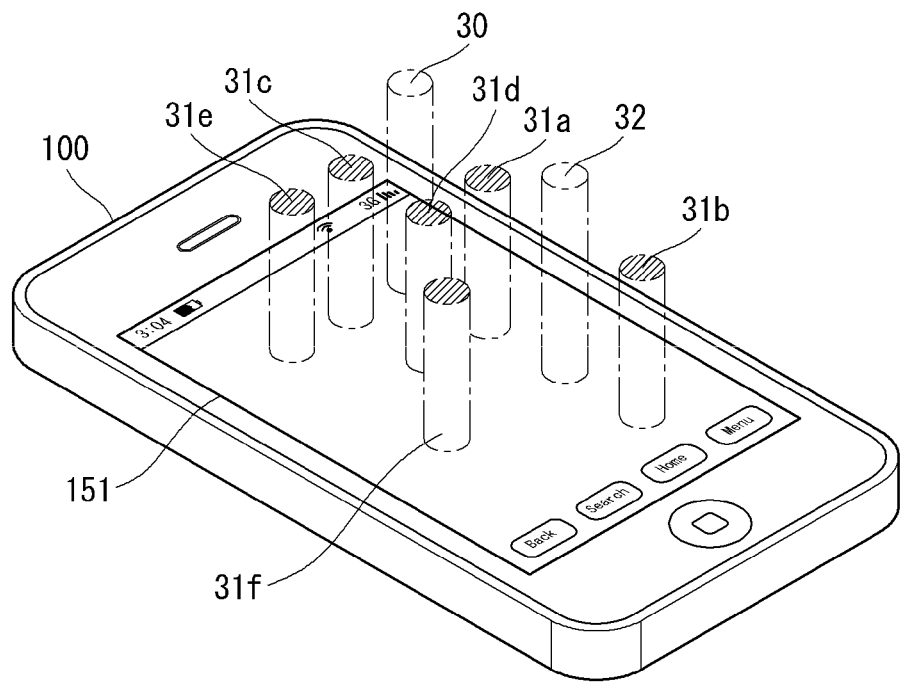

Also, for example, with reference to FIG. 22, the controller 180 may display only a plurality of stereoscopic graphic objects having depth levels greater than or equal to that of the particular stereoscopic graphic object 31*f* selected in FIG. 14 on the touch screen 151.

Also, for example, in FIG. 22, the controller 180 may display only a plurality of stereoscopic graphic objects having depth levels greater than that of the particular stereoscopic graphic object 31*f* selected in FIG. 14 on the touch screen 151.

Figure 23:
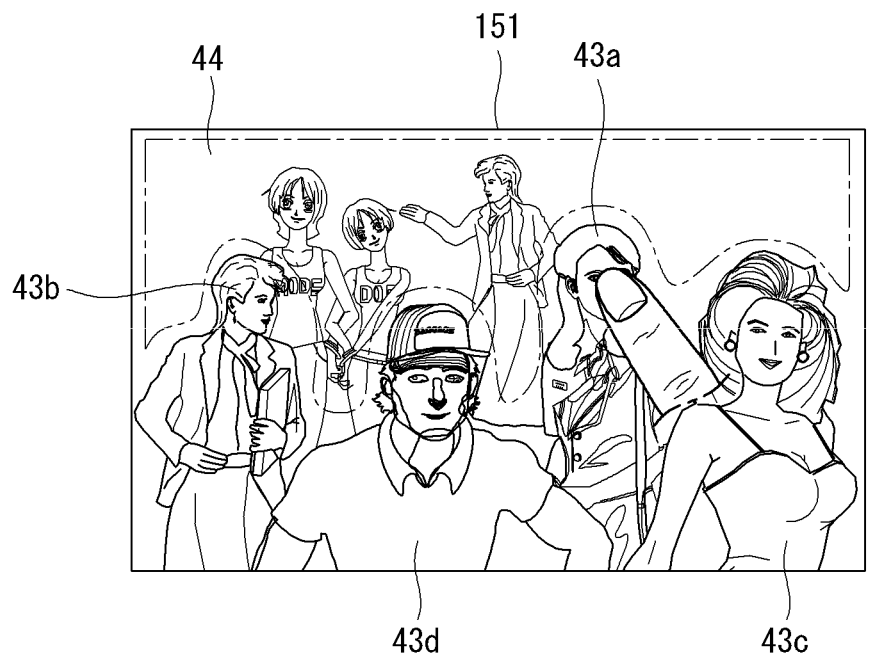
Figure 24:
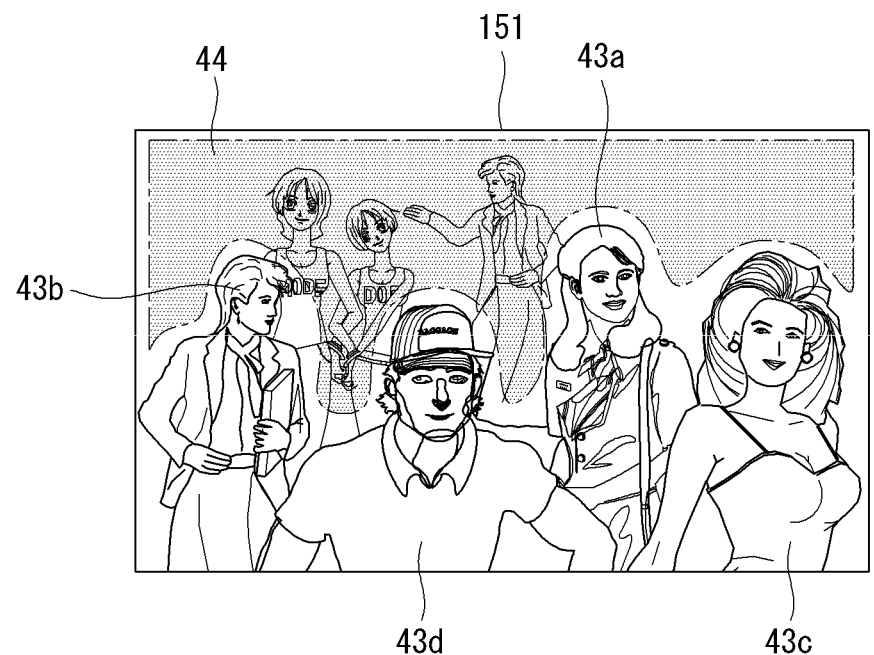

FIGS. 23 and 24 show another embodiment implementing the method of controlling the mobile terminal illustrated in FIGS. 11 and 12.

For example, the controller 180 may display an image including the plurality of objects (e.g., 43*a*, 43*b*, 43*c*, and 43*d*) as shown in FIG. 23. The image illustrated in FIG. 23 may be an image stored in the memory 160 or may be an image input through the camera 121. Here, the camera 121 may include two cameras in order to generate a 3D image using binocular parallax.

Meanwhile, it is assumed that the plurality of objects (e.g., 43*a*, 43*b*, 43*c*, and 43*d*) included in the image illustrated in FIGS. 23 and 24 are displayed as stereoscopic graphic objects using binocular parallax.

In FIG. 23, the plurality of objects (e.g., 43*a*, 43*b*, 43*c*, and 43*d*) included in the image may have different depth levels according to depth perception. Thus, the plurality of objects (e.g., 43*a*, 43*b*, 43*c*, and 43*d*) included in the image may be seen to have different degrees of advancing or receding.

As shown in FIG. 23, the user may select a particular object 43*a* among the plurality of objects (e.g., 43*a*, 43*b*, 43*c*, and 43*d*) having different depth levels by touching it with his finger (S200, S300).

In response to the user's operation illustrated in FIG. 23, the controller 180 may specify the reference range based on the depth level of the selected particular object 43*a* (S310). Here, it is assumed that the reference range is specified to be greater than the depth level of the selected particular object 43*a*.

The controller 180 may maintain display characteristics of the plurality of objects (e.g., 43*a*, 43*b*, 43*c*, and 43*d*) having depth levels greater than that of the selected particular object 43*a* among the plurality of objects included in the displayed image and change display characteristics of the other remaining objects (i.e., the plurality of objects included in the region denoted by reference numeral 44) (S210, S320).

In FIG. 24, the controller 180 may display the other remaining objects (i.e., the plurality of objects included in the region denoted by reference numeral 44) dimly, thus controlling displaying of the plurality of objects 43*a*, 43*b*, 43*c*, and 43*d* and displaying of the other remaining objects (i.e., the plurality of objects included in the region denoted by reference numeral 44) differently.

Figure 25:
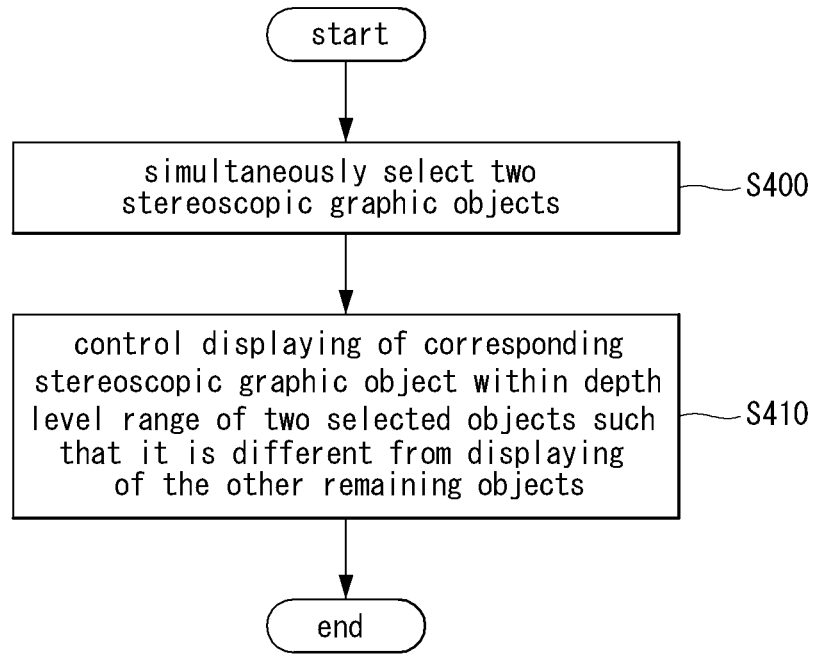
Figure 26:
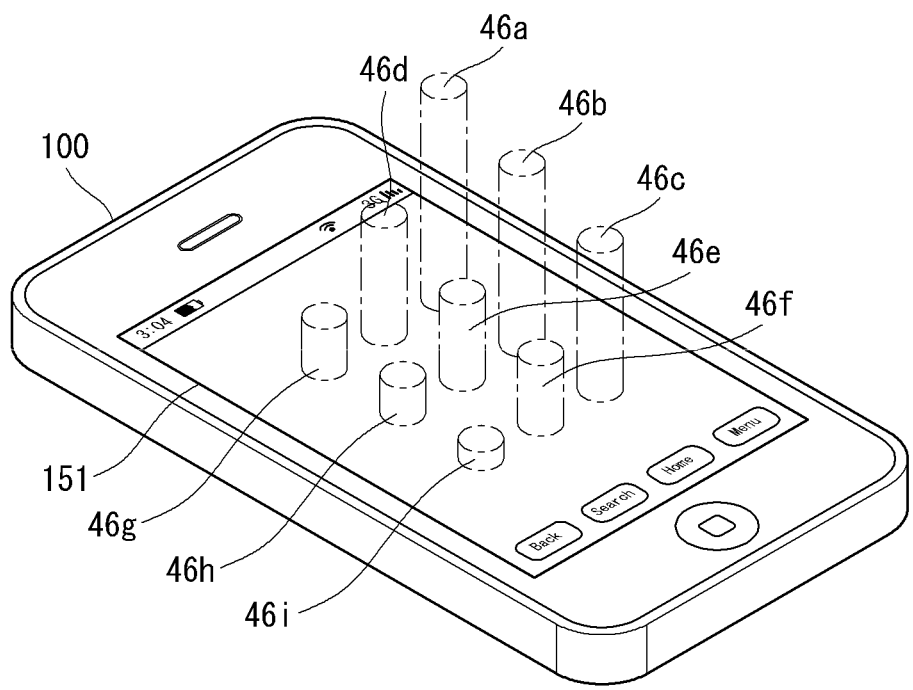

FIG. 25 shows a specific different embodiment of the method of controlling the mobile terminal illustrated in FIG. 11. FIG. 26 is a view showing an example of a screen for explaining the embodiment illustrated in FIG. 25.

With reference to FIG. 26, according to the foregoing first embodiment of the present invention, the controller 180 may display a plurality of stereoscopic graphic objects 46*a*, 46*b*, 46*c*, 46*d*, 46*e*, 46*f*, 46*g*, 46*h*, and 46*i* on the touch screen 151 such that they have different depth levels according to respective usage patterns.

Figure 27:
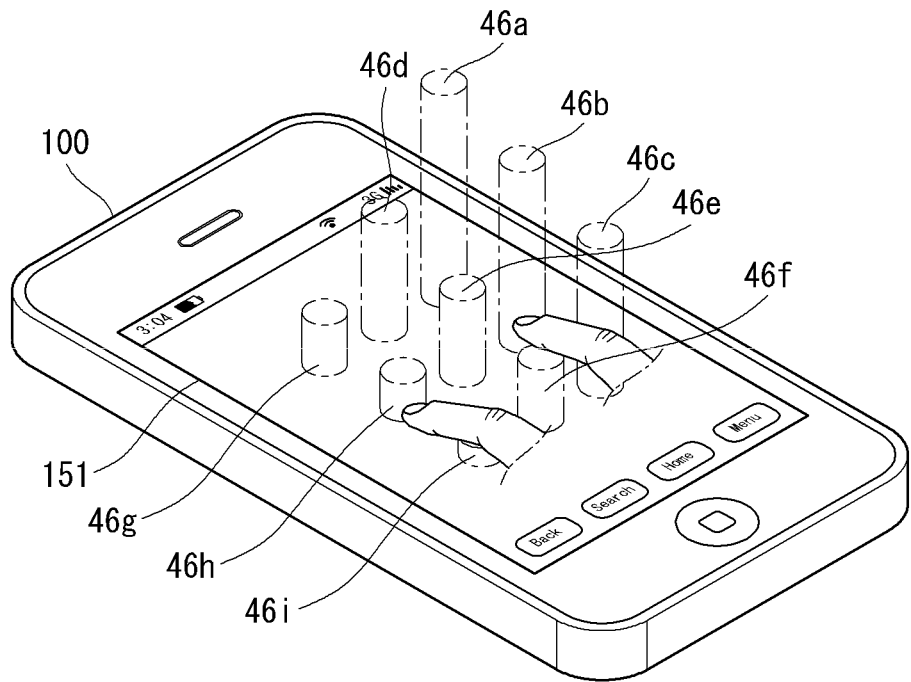

With reference to FIGS. 25 and 27, the controller 180 may receive a select signal for simultaneously selecting certain two stereoscopic graphic objects 46*b* and 46*h* from among the plurality of stereoscopic graphic objects 46*a*, 46*b*, 46*c*, 46*d*, 46*e*, 46*f*, 46*g*, 46*h*, and 46*i* displayed on the touch screen 151 (S400). Hereinafter, the two selected stereoscopic graphic objects 46*b* and 46*h* will be referred to as a first stereoscopic graphic object 46*b* and a second stereoscopic graphic object 46*h*.

The controller 180 may control displaying of the stereoscopic graphic objects within the depth level range formed by the depth level (referred to as a 'first depth', hereinafter) of the first stereoscopic graphic object 46*b* and the depth (referred to as a 'second depth level', hereinafter) of the second stereoscopic graphic object 46*h* such that it is different from displaying of the other remaining stereoscopic graphic objects (S410).

Figure 28:
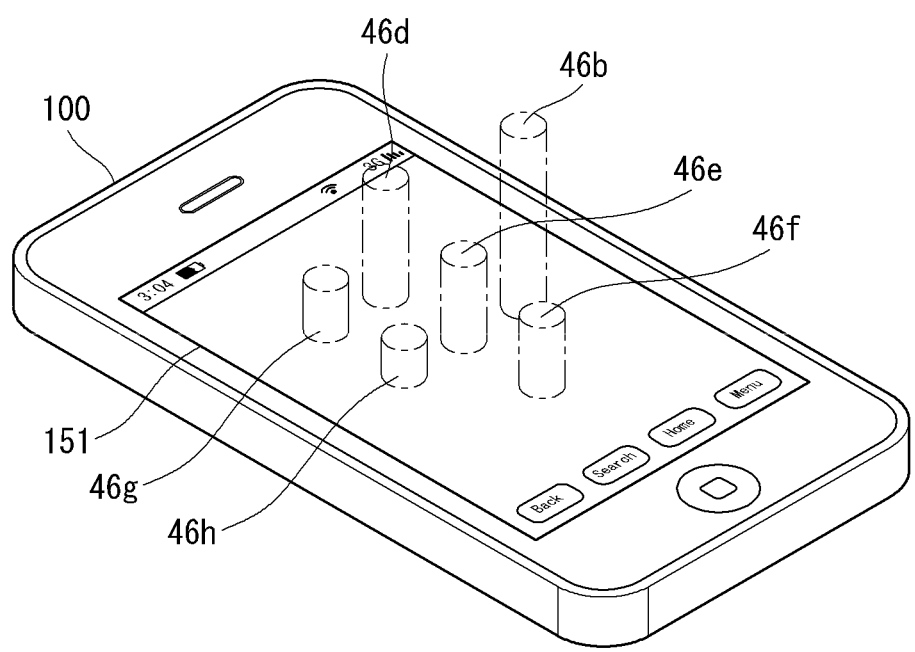

FIG. 28 is a view showing a screen example implementing step S410. For example, with reference to FIGS. 27 and 28, the other remaining stereoscopic graphic objects 46*a*, 46*c*, and 46*i* having depth levels outside the range formed by the first and second depth levels may disappear from the touch screen 151.

Figure 29:
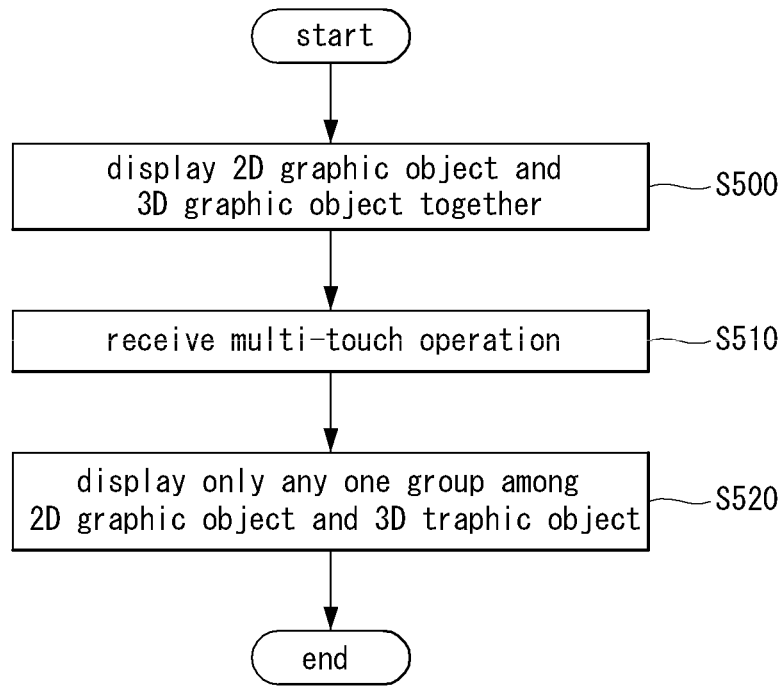
FIG. 29 is a flow chart illustrating a process of a method of controlling a mobile terminal according to a third embodiment of the present invention.

FIG. 29 is a flow chart illustrating a process of a method of controlling a mobile terminal according to a third embodiment of the present invention. FIGS. 30 to 36 are views explaining the method of controlling a mobile terminal according to the third embodiment of the present invention.

The method of controlling a mobile terminal according to the third embodiment of the present invention may be implemented in the mobile terminal 100 described above with reference to FIGS. 1 to 5. Hereinafter, the method of controlling a mobile terminal according to the third embodiment of the present invention and the operation of the mobile terminal 100 for implementing the same will now be described in detail with reference to the relevant drawings.

Hereinafter, it is assumed that the display unit 151 is a touch screen.

With reference to FIG. 29, the controller 180 may display at least one 2D graphic object and at least one 3D graphic object together on the touch screen 151 (S500).

The at least one 3D graphic object displayed in step S500 may include a stereoscopic graphic object using binocular parallax and a stereoscopic graphic object configured as a plurality of 2D graphic objects form layers.

Here, step S500 may be implemented based on the foregoing first embodiment of the present invention. Namely, the depth level of the at least one 3D graphic object displayed by performing step S500 may be determined according to the user's usage pattern.

Figure 30:
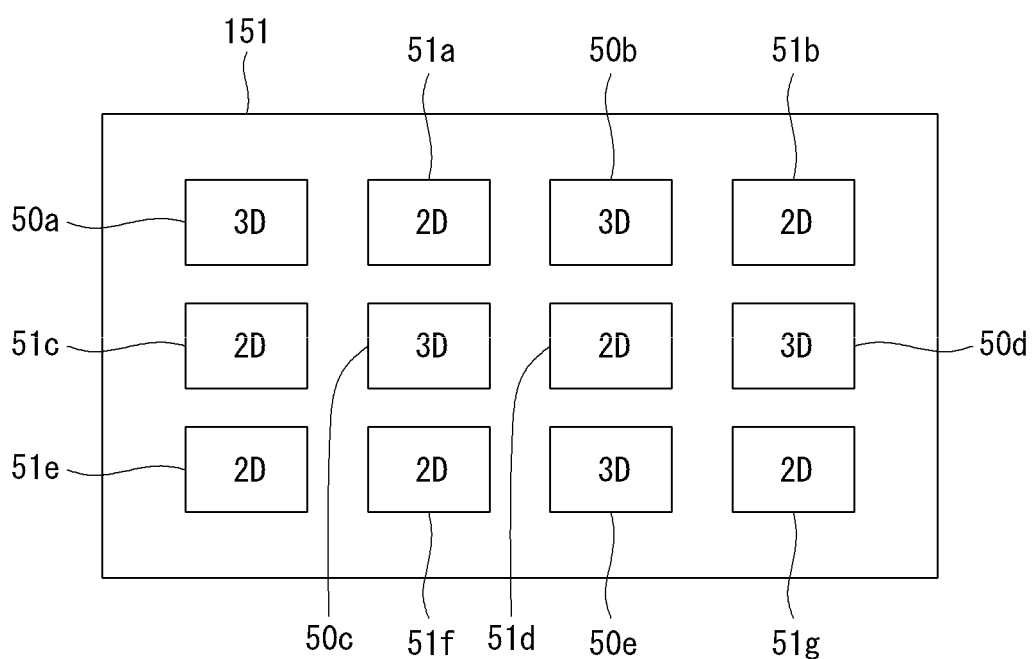
FIGS. 30 to 36 are views explaining the method of controlling a mobile terminal according to the third embodiment of the present invention.

FIG. 30 shows an example of a screen implementing step S500. The screen illustrated in FIG. 30 displays a plurality of 2D graphic objects 51a, 51b, 51c, 51d, 51e, 51f, and 51g, and a plurality of 3D graphic objects 50a, 50b, 50c, 50d, and 50e.

The controller 180 may receive a user's multi-touch operation through the touch screen 151 (S510). The multi-touch operation may include a direct touch and a proximity touch with respect to the touch screen 151.

In response to the received multi-touch operation, the controller 180 may display only any one of the 2D object group including the at least one 2D graphic object and the 3D object group including the at least one 3D graphic object on the touch screen 151 (S520).

Specific embodiments implementing steps S510 and S520 will now be described with reference to the accompanying drawings.

Figure 31:
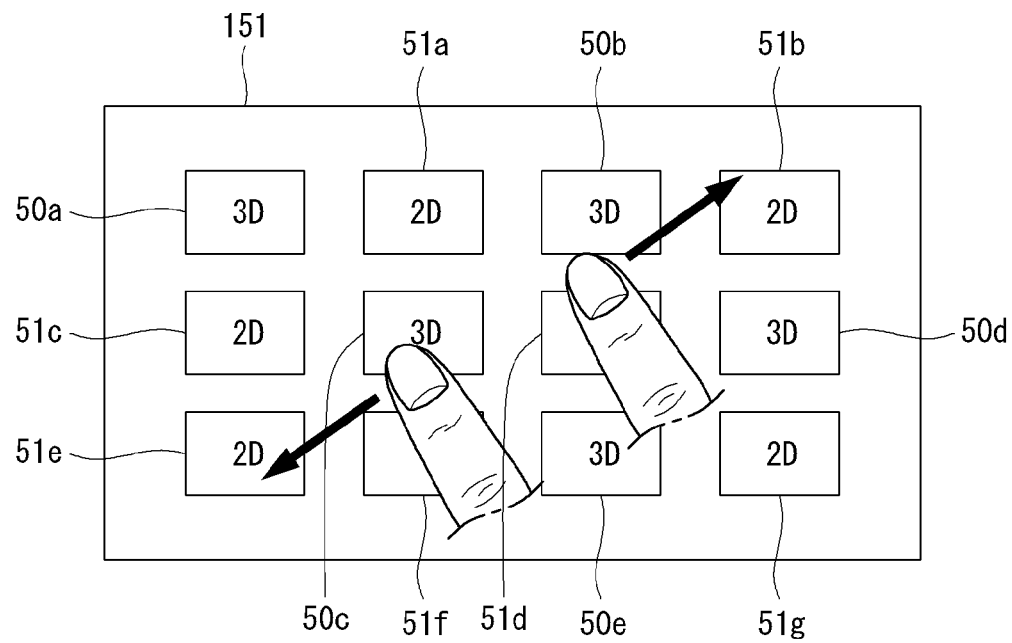

With reference to FIG. 31, the user may input a multi-touch operation of opening certain two points of the touch screen 151 with two fingers (S510).

Figure 32:
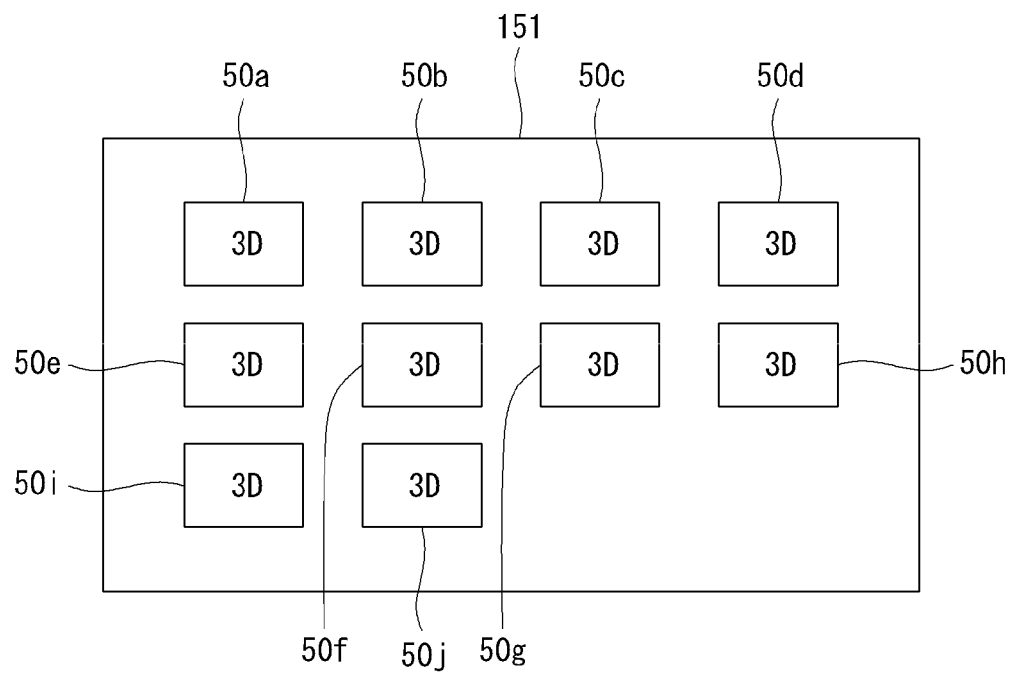

According to the multi-touch operation input in FIG. 31, as shown in FIG. 32, the controller 180 may display only the plurality of 3D graphic objects 50a, 50b, 50c, 50d, 50e, 50f, 50g, 50h, 50i, and 50j on the touch screen 151 (S520). Some 3D graphic objects 50f, 50g, 50h, 50i, and 50j are those which have not been displayed due to the restriction in size of the screen in FIG. 30.

In performing step S520, the controller 180 may use the foregoing 3D content search engine 185.

Also, with reference to FIG. 33D, the user may input a multi-touch operation of closing certain two points of the touch screen 151 with two fingers (S510).

Figure 33:
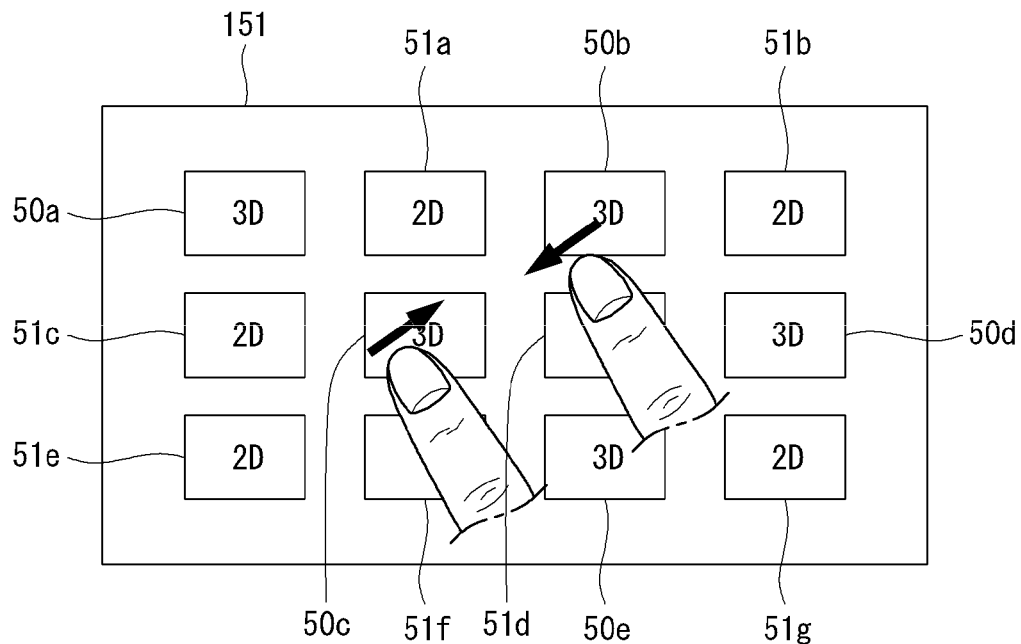
Figure 34:
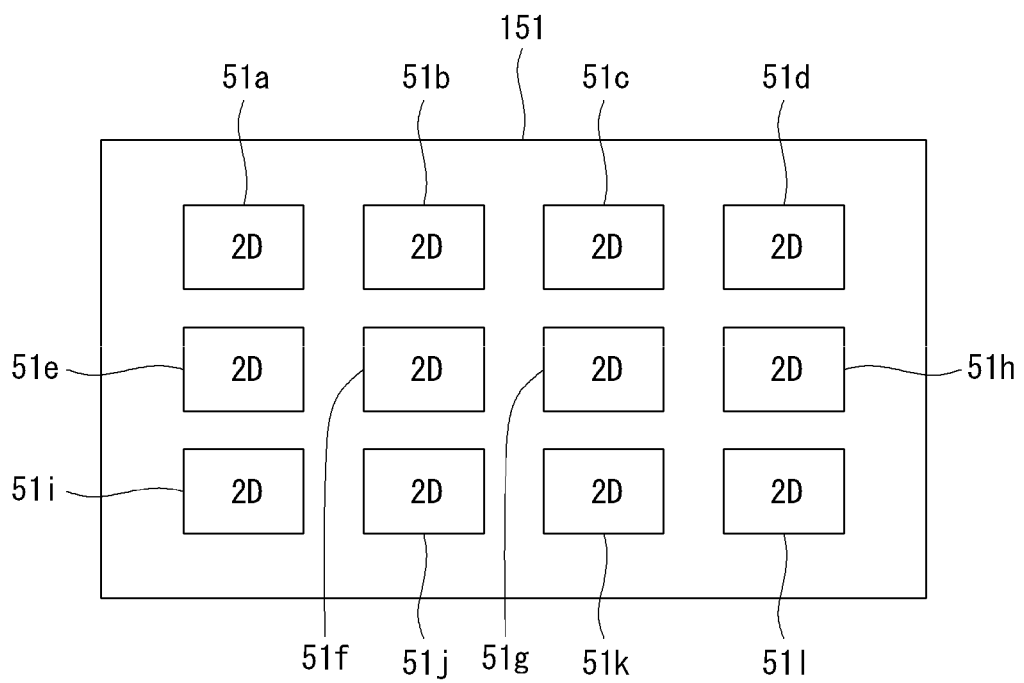
Figure 35:
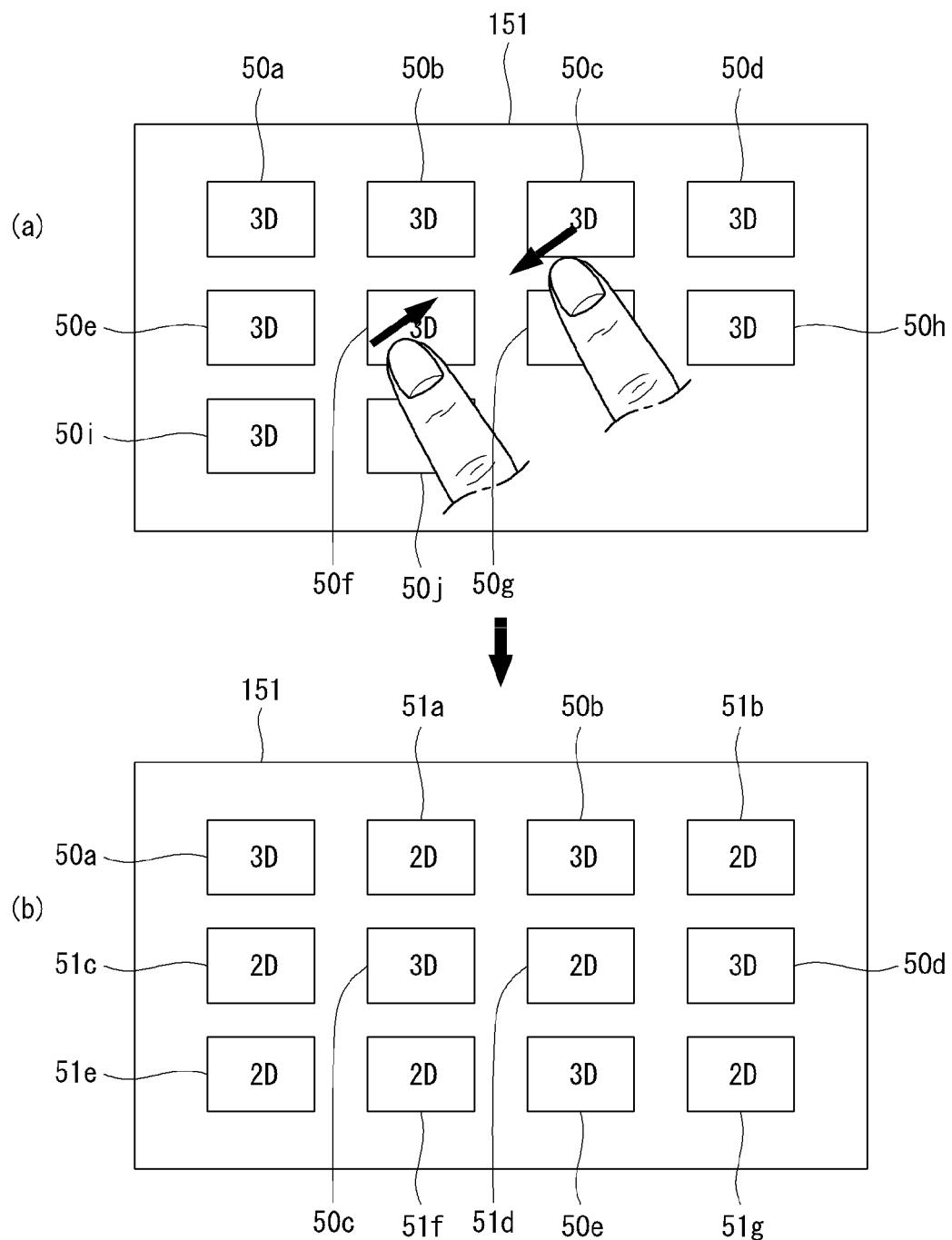
Figure 36:
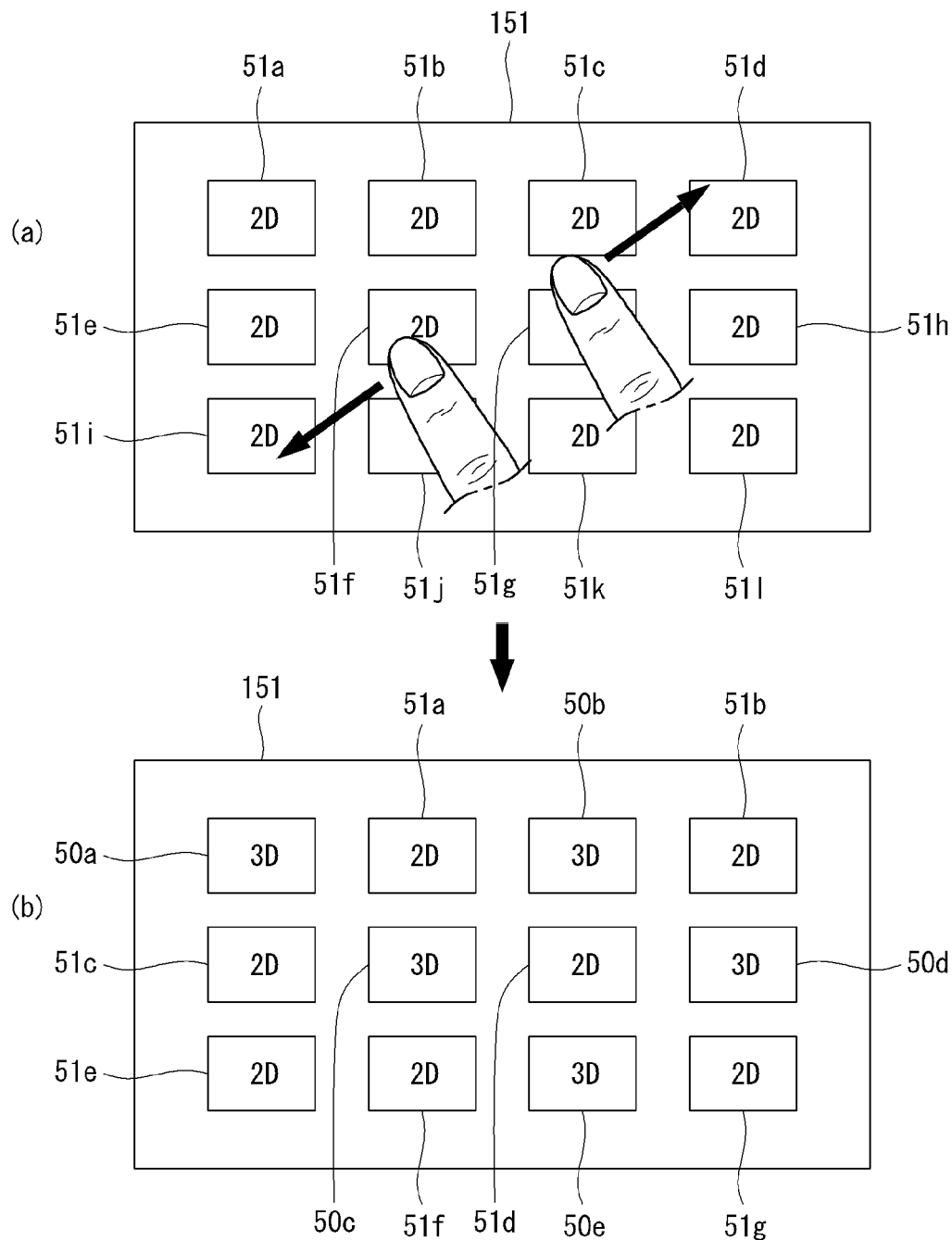

According to the multi-touch operation input in FIG. 33, as shown in FIG. 34, the controller 180 may display only the plurality of 2D graphic objects 51a, 51b, 51c, 51d, 51e, 51f, 51g, 51h, 51i, 51j, 51k, and 51l on the touch screen 151 (S520). Some 2D graphic objects 51h, 51i, 51j, 51k, 51l are those which have not been displayed due to the restriction in size of the screen in FIG. 30.

Meanwhile, when the multi-touch operation of closing the two points with two fingers in the screen of FIG. 32 (See FIG. 35(a)) is input, it may be returned to the screen of FIG. 30 (See FIG. 35(b)).

Also, when the multi-touch operation of opening the two points with two fingers in the screen of FIG. 34 (See FIG. 36(a)) is input, it may be returned to the screen of FIG. 30 (See FIG. 36(b)).

Figure 37:
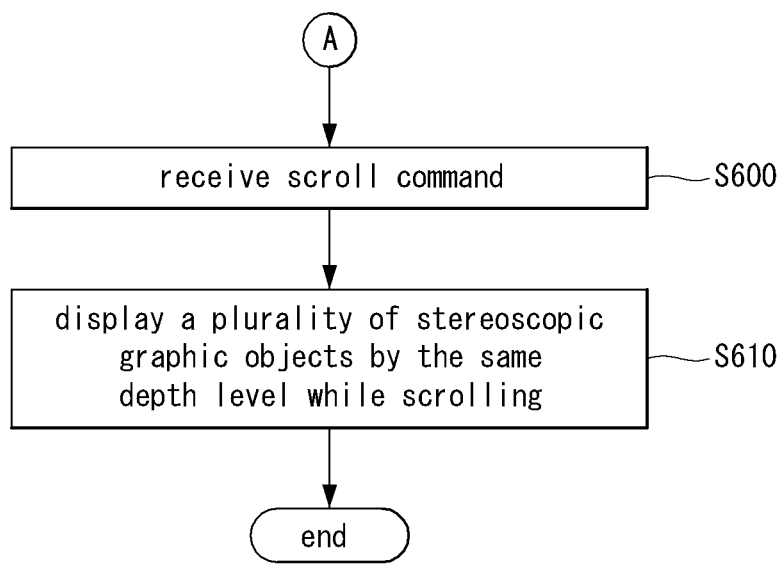
FIG. 37 is a flow chart illustrating a process of a method of controlling a mobile terminal according to a fourth embodiment of the present invention.
Figure 38:
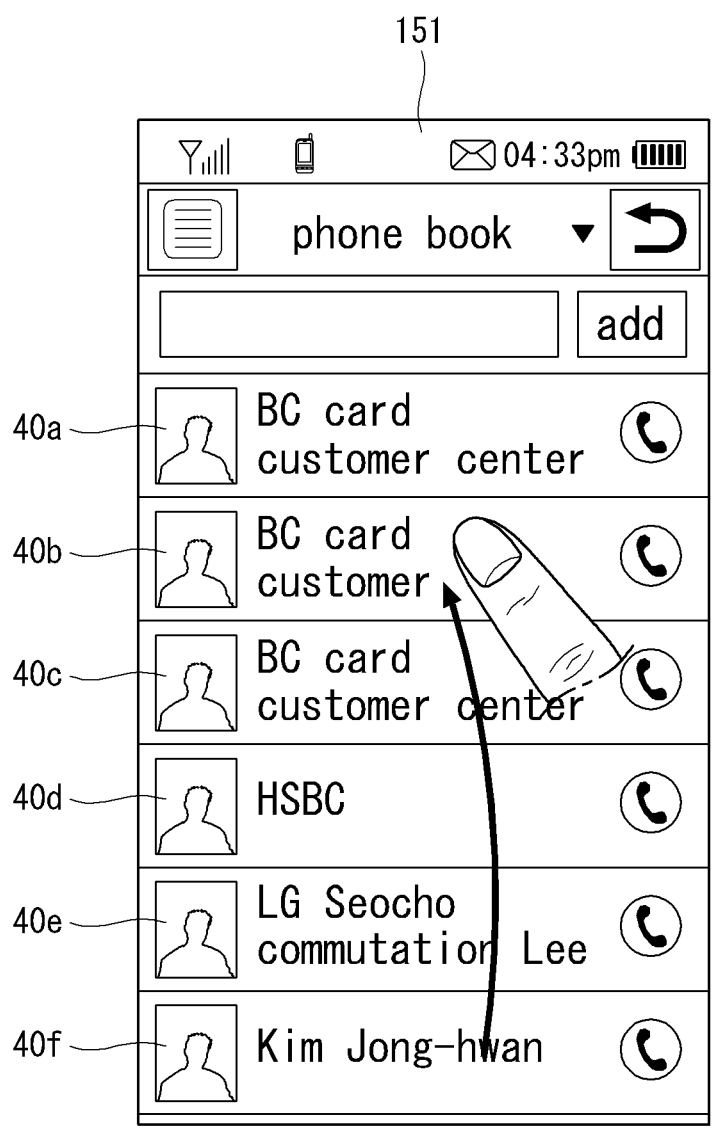
FIGS. 38 to 40 are views explaining the method of controlling a mobile terminal according to the fourth embodiment of the present invention.
Figure 39:
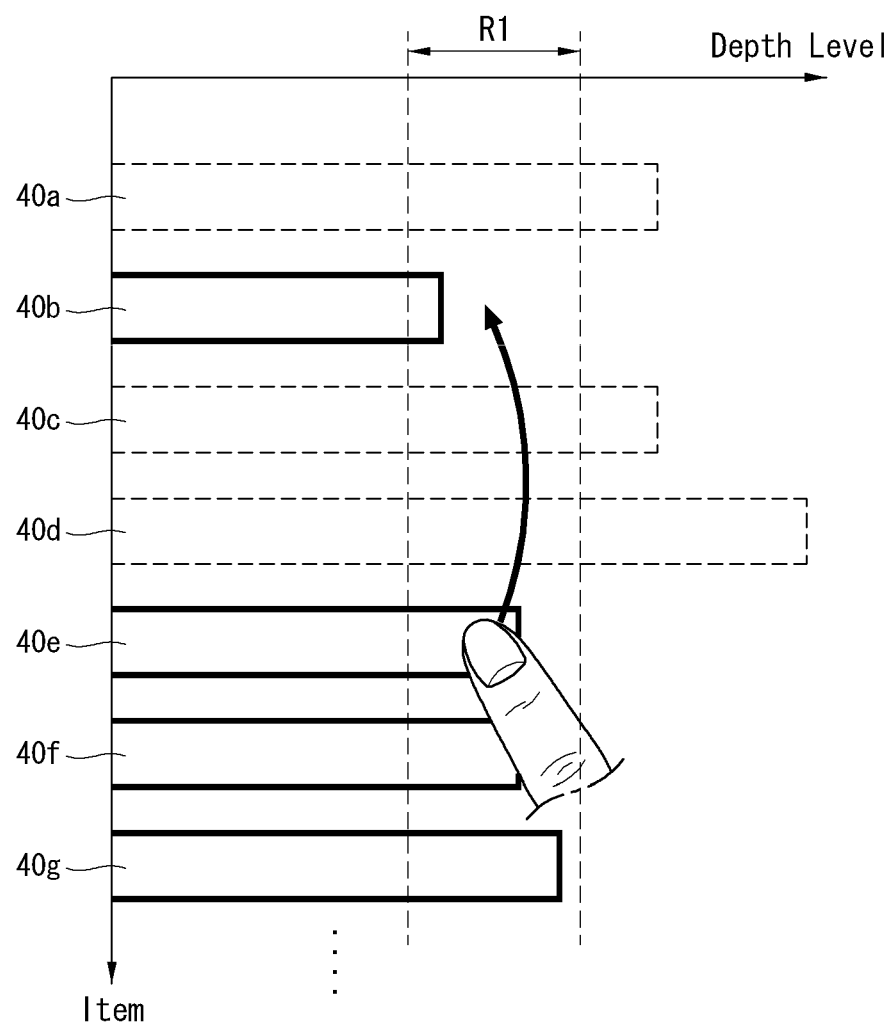
Figure 40:
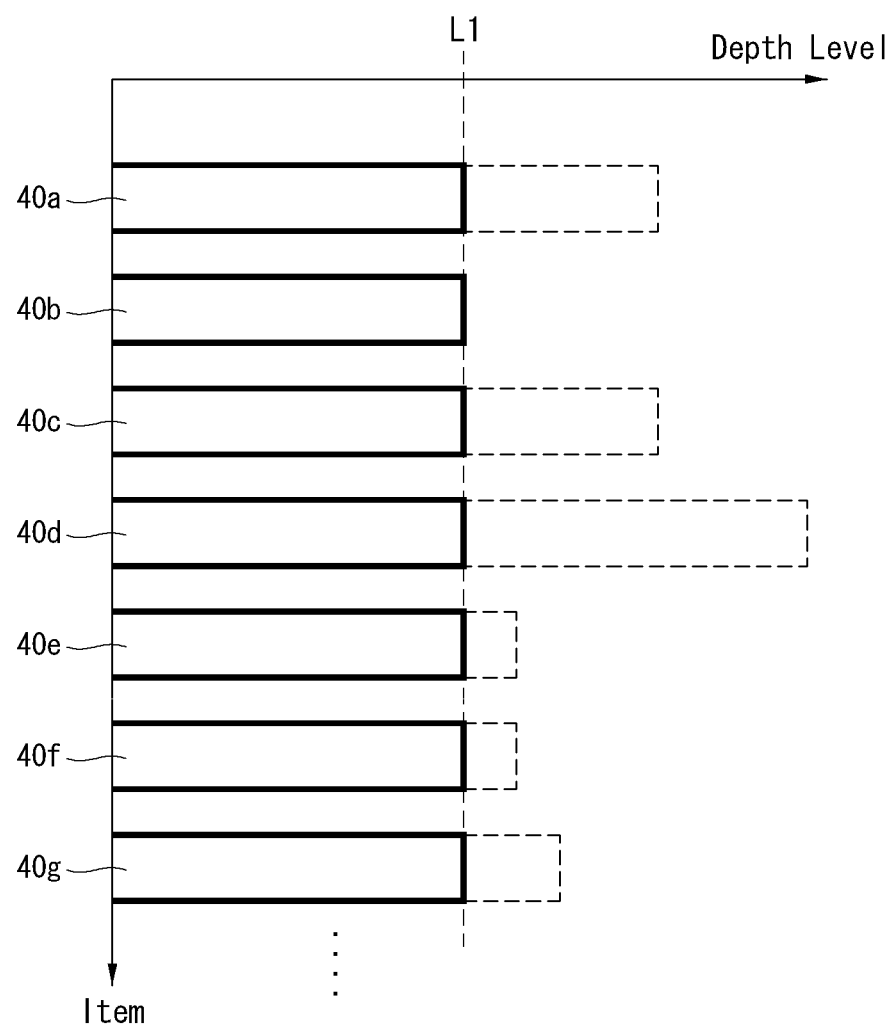

FIG. 37 is a flow chart illustrating a process of a method of controlling a mobile terminal according to a fourth embodiment of the present invention. FIGS. 38 to 40 are views explaining the method of controlling a mobile terminal according to the fourth embodiment of the present invention.

The method of controlling a mobile terminal according to the fourth embodiment of the present invention may be implemented in the mobile terminal 100 described above with reference to FIGS. 1 to 5. Hereinafter, the method of controlling a mobile terminal according to the fourth embodiment of the present invention and the operation of the mobile terminal 100 for implementing the same will now be described in detail with reference to the relevant drawings.

The method of controlling a mobile terminal according to the fourth embodiment of the present invention may be implemented based on the foregoing first embodiment of the present invention. Also, hereinafter, it is assumed that the display unit 151 is a touch screen.

With reference to FIG. 37, the controller 180 may receive a scroll command according to a touch operation through the touch screen 151 on which a plurality of stereoscopic graphic objects (S600). The touch operation may include a direct touch and a proximity touch with respect to the touch screen 151. The touch operation in step S600 may be a stroke including a drag operation and a flicking operation.

Meanwhile, the plurality of stereoscopic graphic objects displayed on the touch screen 151 may have different depth levels based on respective usage patterns according to the foregoing first embodiment of the present invention.

FIG. 38 shows an example of performing step S600. The user may input a stroke in an upward direction through the touch screen 151.

While scrolling the screen according to the received scroll command, the controller 180 may display the plurality of stereoscopic graphic objects such that they have the same depth level on the touch screen 151 (S610).

Step S610 may be performed in various manners.

For example, in performing step S610, the controller 180 may scroll the screen while displaying only the stereoscopic graphic objects having depth levels within a predetermined range on the touch screen 151, without changing the depth levels of the plurality of stereoscopic graphic objects.

With reference to FIG. 39, during scrolling the screen (namely, while the screen is being scrolled), the controller 180 may display only the stereoscopic graphic objects 40b, 40e, 40f, and 40g having depth levels within the range R1 on the touch screen 151 and may not display the other remaining stereoscopic graphic objects 40a, 40c, and 40d not within the range R1 on the touch screen 151.

Also, for example, in performing step S610, the controller 180 may change the depth levels of the plurality of stereoscopic graphic objects to reference depth levels to scroll the screen.

With reference to FIG. 40, during scrolling the screen, the controller 180 may adjust the depth levels of all of the stereoscopic graphic objects 40a, 40b, 40c, 40d, 40e, 40f, and 40g into a depth level L1 and display the same on the touch screen 151. Namely, the controller 180 may temporarily disregard the depth levels according to the usage patterns during scrolling the screen.

In FIG. 40, when the screen scrolling is stopped, the depth levels of the stereoscopic graphic objects 40a, 40b, 40c, 40d, 40e, 40f, and 40g are returned to the initial depth levels based on the user's usage patterns.

Figure 41:
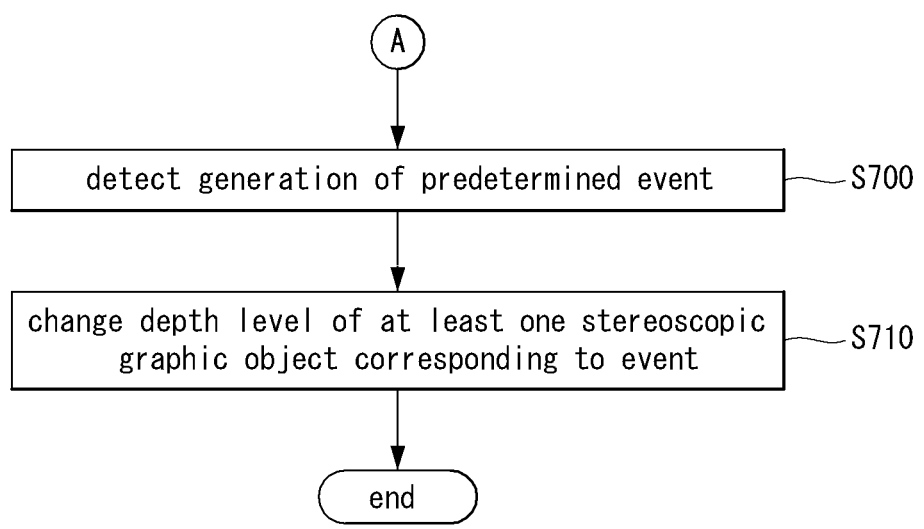
FIG. 41 is a flow chart illustrating a process of a method of controlling a mobile terminal according to a fifth embodiment of the present invention.

FIG. 41 is a flow chart illustrating a process of a method of controlling a mobile terminal according to a fifth embodiment of the present invention. FIGS. 42 to 47 are views explaining the method of controlling a mobile terminal according to the fifth embodiment of the present invention.

The method of controlling a mobile terminal according to the fifth embodiment of the present invention may be implemented in the mobile terminal 100 described above with reference to FIGS. 1 to 5. Hereinafter, the method of controlling a mobile terminal according to the fifth embodiment of the present invention and the operation of the mobile terminal 100 for implementing the same will now be described in detail with reference to the relevant drawings.

The method of controlling a mobile terminal according to the fifth embodiment of the present invention may be implemented based on the foregoing first embodiment of the present invention. Also, hereinafter, it is assumed that the display unit 151 is a touch screen.

With reference to FIG. 41, in a state in which a plurality of stereoscopic graphic objects having different depth levels are displayed on the touch screen 151, the controller 180 may detect an occurrence of a predetermined event (S700). The controller 180 may change a depth level of at least one stereoscopic graphic object corresponding to the detected event (S710).

Implementation examples of steps S700 and S710 will be described with reference to FIGS. 42 to 47.

Figure 42:
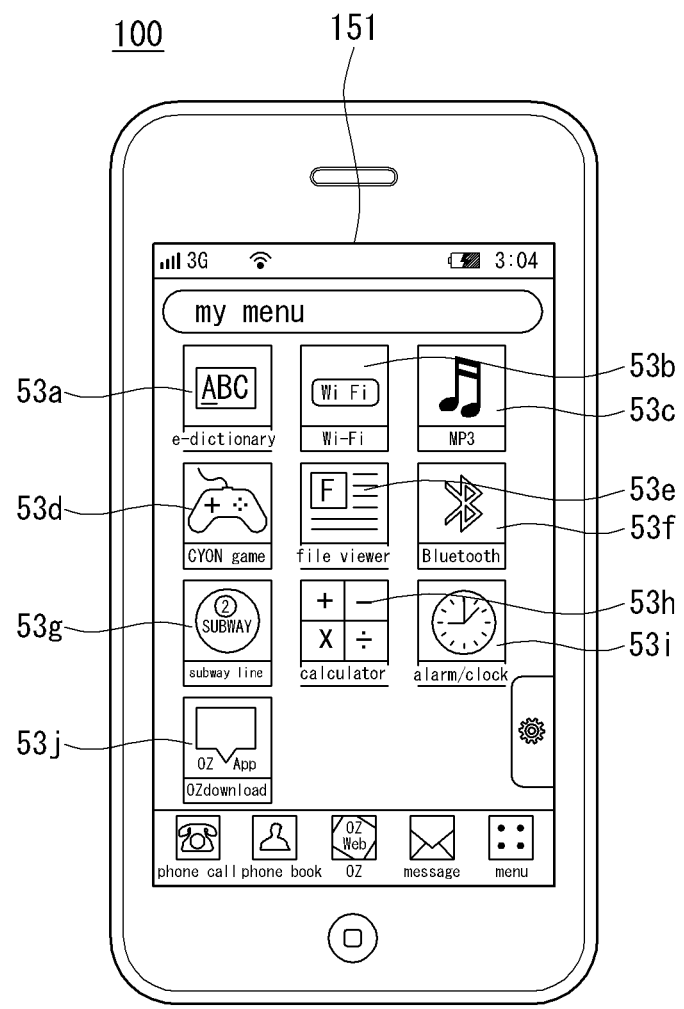
FIGS. 42 to 47 are views explaining the method of controlling a mobile terminal according to the fifth embodiment of the present invention.

With reference to FIG. 42, the controller 180 may display a plurality of stereoscopic graphic objects 53a, 53b, 53c, 53d, 53e, 53f, 53g, 53h, 53i, and 53j on the touch screen 151.

The user may input a predetermined touch operation such as rubbing, or the like, a region in which content is not displayed among the entire regions of the touch screen 151, as the predetermined event (See FIG. 43), and the controller 180 may detect the user's touch operation as the predetermined event (S700).

Figure 43:
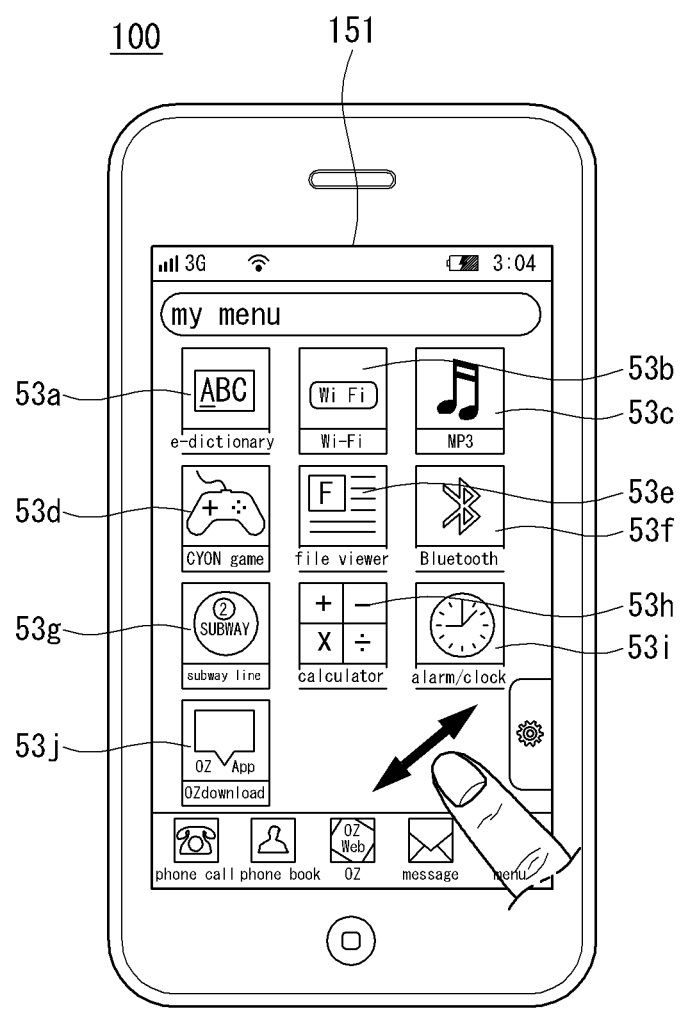

As the predetermined input signal such as the user's touch operation performed in FIG. 43 is received, the controller 180 may change the depth level of the at least one stereoscopic graphic object corresponding to an application or content which is currently executed (or activated or executed as a background) (S710).

Figure 44:
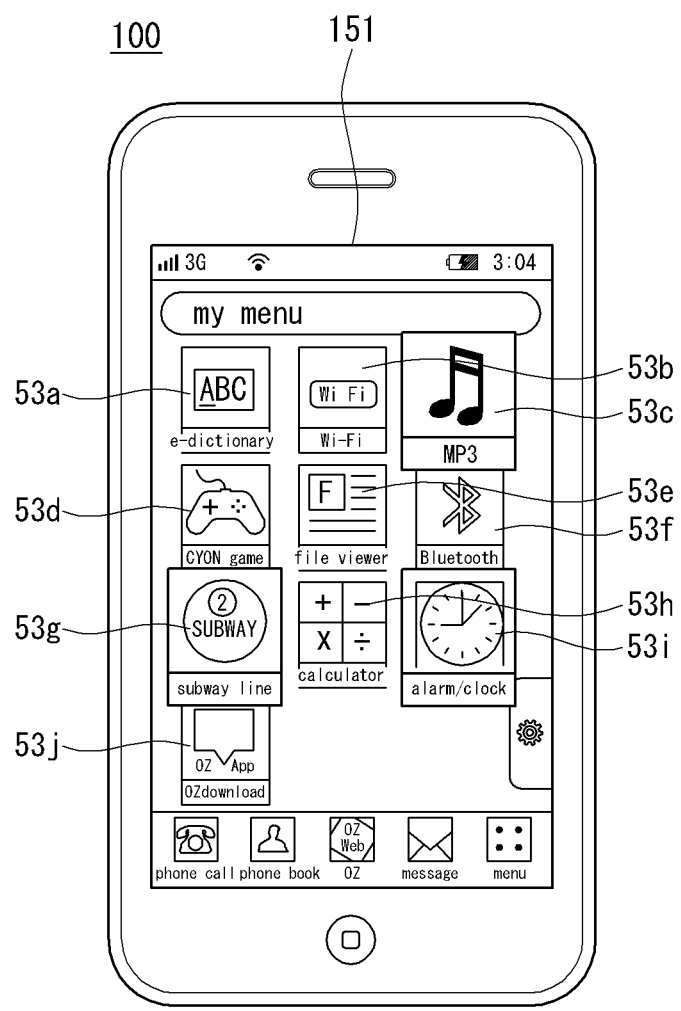

For example, with reference to FIG. 44, the controller 180 may increase the depth levels of three stereoscopic graphic objects 53c, 53g, and 53i corresponding to the applications being currently executed as a background, such that the three stereoscopic graphic objects 53c, 53g, and 53i are seen to advance in comparison to the original state by the user.

Meanwhile, when the predetermined input signal which has caused the screen illustrated in FIG. 44 is received again, the controller 180 may perform at least one of an operation of returning the depth level of the at least one stereoscopic graphic object which has been changed to the initial depth level before being changed and an operation of stopping execution of the application or the content corresponding to the at least one stereoscopic graphic object.

Re-receiving of the predetermined input signal may not be necessarily the same as the operation illustrated in FIG. 43.

Figure 45:
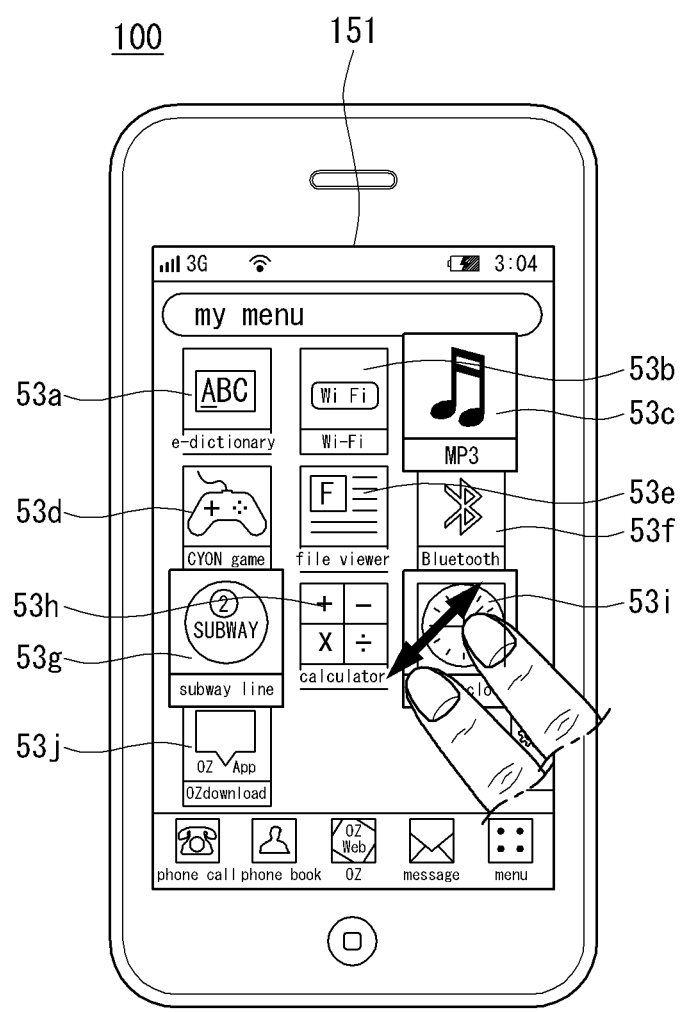
Figure 46:
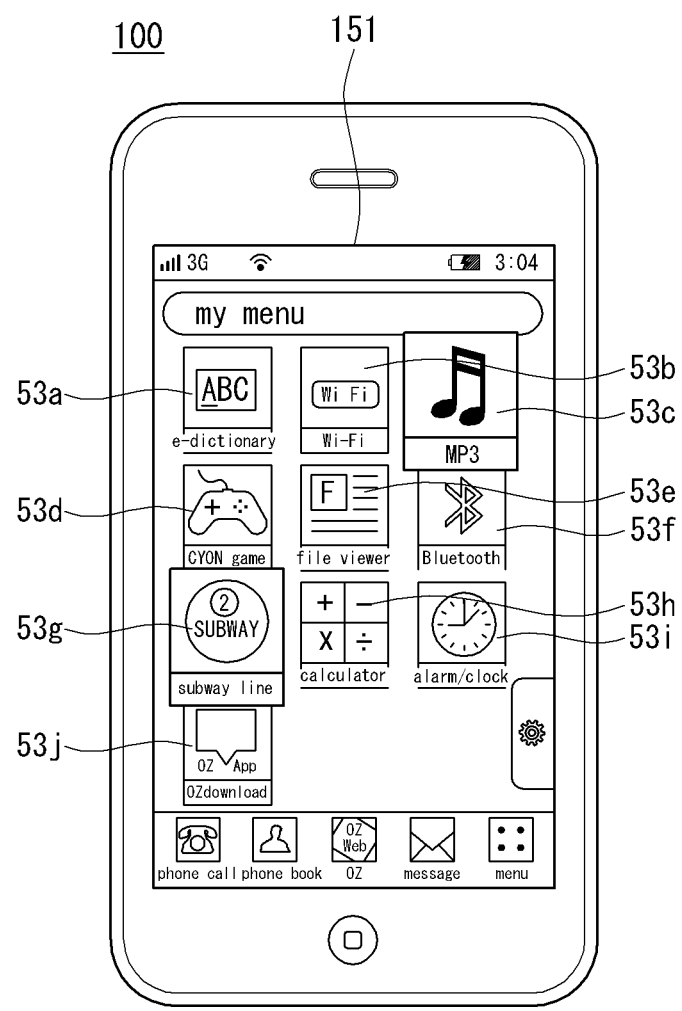

For example, with reference to FIG. 45, when the user inputs a touch operation of running a particular stereoscopic graphic object 53i with his finger in the state illustrated in FIG. 44, as shown in FIG. 46, the controller 180 may perform at least one of the operation of returning the depth level of the particular stereoscopic graphic object 53i to the initial depth level before being changed and the operation of stopping execution of the application corresponding to the particular stereoscopic graphic object 53i.

Figure 47:
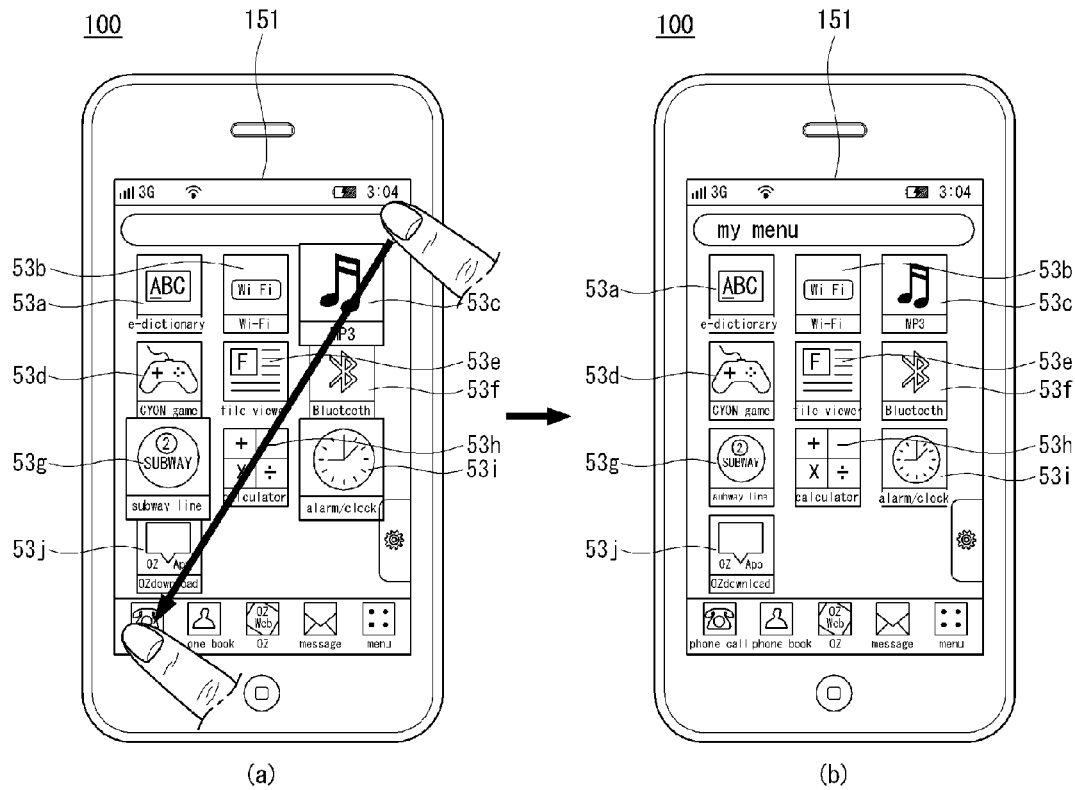

FIG. 47 is a view showing another example of performing the operation of returning the depth level and/or the operation of stopping the execution.

For example, with reference to FIG. 47, when the controller 180 receives a touch operation of sweeping the screen 151 from the user (See FIG. 47(a)), the controller 180 may perform at least one of the operation of returning the depth levels of all of the stereoscopic graphic objects 53c, 53g, and 53i which have been changed to the initial depth levels before being changed and the operation of stopping execution of all of the applications corresponding to the stereoscopic graphic objects 53c, 53g, and 53i (See FIG. 47(b)).

Meanwhile, a data may be received from the outside or a particular application may be automatically executed, as the predetermined event mentioned in step S700.

For example, when a message is received from the outside, the controller 180 may change the depth level of a stereoscopic graphic object corresponding to a message application among the plurality of stereoscopic graphic objects displayed on the touch screen 151 to inform the user about the reception of the message.

Also, for example, when a pre-set alarm time arrives, the controller 180 may change the depth level of a stereoscopic graphic object corresponding to an alarm application.

Also, for example, when a news or new traffic information is received by a news widget or a traffic information widget from the outside, the controller 180 may change the depth level of a stereoscopic graphic object corresponding to the widget which has received the information among the plurality of stereoscopic graphic objects currently displayed on the touch screen 151 to inform the user about the reception of the information.

Figure 48:
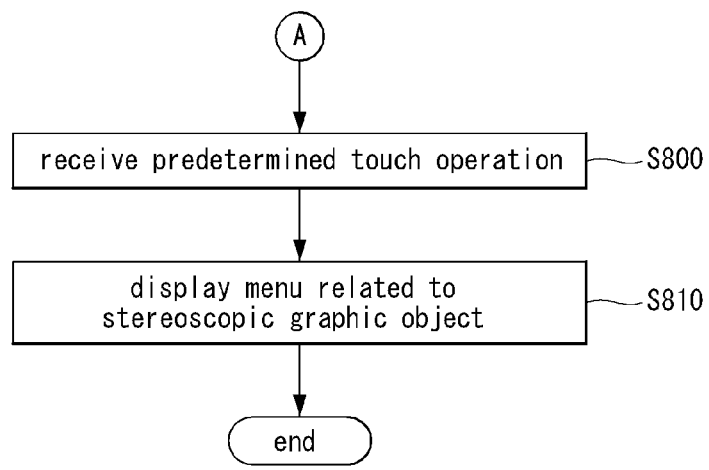
FIG. 48 is a flow chart illustrating a method of controlling a mobile terminal according to a sixth embodiment of the present invention.
Figure 49:
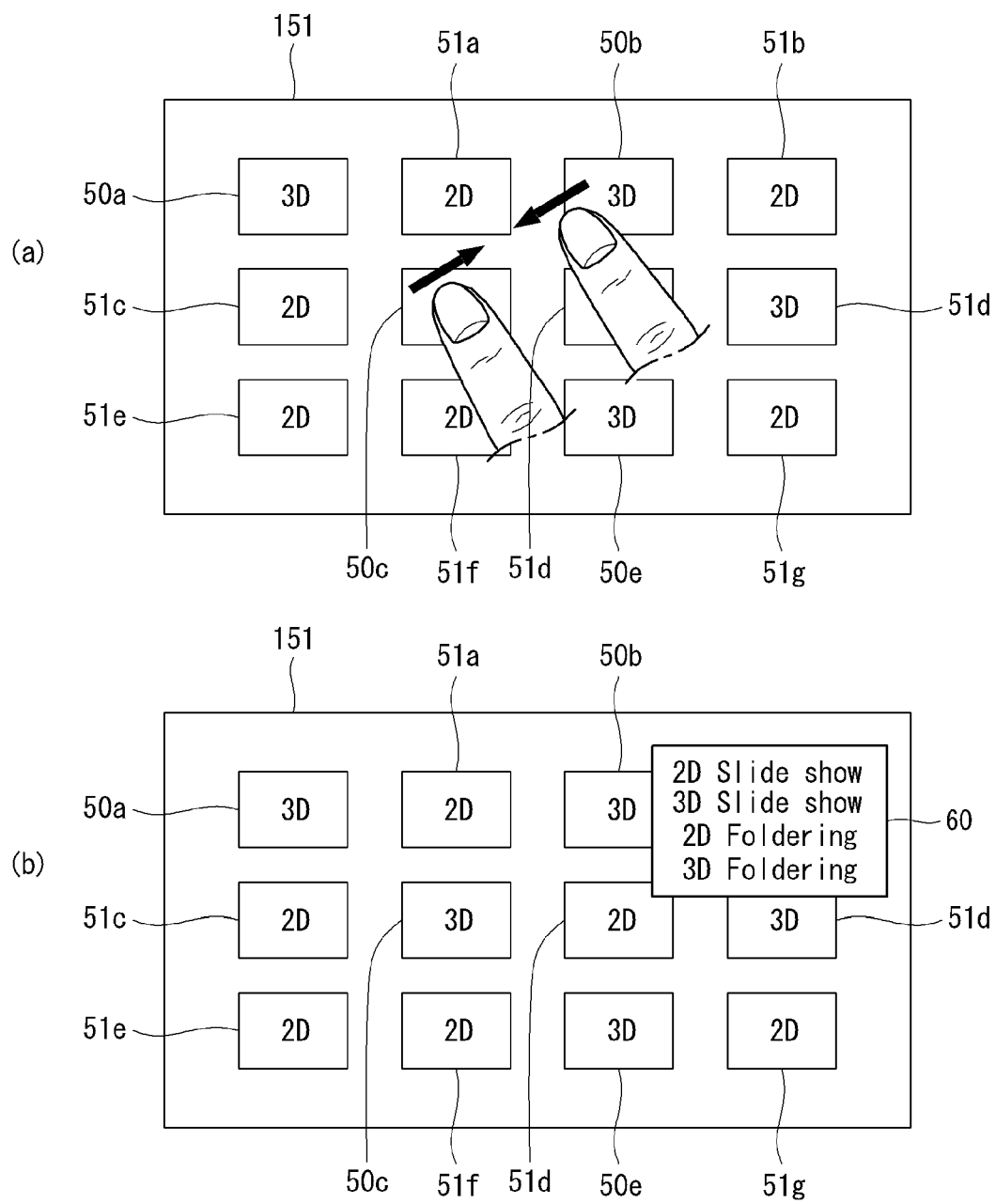
FIG. 49 is a view showing examples for explaining the method of controlling a mobile terminal according to the sixth embodiment of the present invention.

FIG. 48 is a flow chart illustrating a method of controlling a mobile terminal according to a sixth embodiment of the present invention. FIG. 49 is a view showing examples explaining the method of controlling a mobile terminal according to the sixth embodiment of the present invention.

The method of controlling a mobile terminal according to the sixth embodiment of the present invention may be implemented in the mobile terminal 100 described above with reference to FIGS. 1 to 5. Hereinafter, the method of controlling a mobile terminal according to the sixth embodiment of the present invention and the operation of the mobile terminal 100 for implementing the same will now be described in detail with reference to the relevant drawings.

The method of controlling a mobile terminal according to the sixth embodiment of the present invention may be implemented based on the foregoing first embodiment of the present invention. Also, hereinafter, it is assumed that the display unit 151 is a touch screen.

With reference to FIG. 48, the controller 180 may receive a predetermined touch operation through the touch screen 151 displaying a plurality of stereoscopic graphic objects (S800). The predetermined touch operation may include a direct touch and a proximity touch with respect to the touch screen 151.

The controller 180 may display menus related to at least a portion of the plurality of stereoscopic graphic objects displayed on the touch screen 151 according to the reception of the predetermined touch operation (S810).

FIG. 49 shows examples of implementing steps S800 and S810.

For example, with reference to FIG. 49(a), the controller 180 may receive a multi-touch operation such as closing with two fingers through the touch screen 151 from the user (S800). The screen illustrated in FIG. 49(a) displays a plurality of 2D graphic objects 51a, 51b, 51c, 51d, 51e, 51f, and 51g and a plurality of 3D graphic objects 50a, 50b, 50c, 50d, and 50e.

According to the multi-touch operation illustrated in FIG. 49(a), the controller 180 may display a menu box 60 related to the plurality of 2D graphic objects 51a, 51b, 51c, 51d, 51e, 51f, and 51g and a plurality of 3D graphic objects 50a, 50b, 50c, 50d, and 50e on the touch screen 151.

The menu 60 may include menus "2D Slideshow" and "2D Foldering" related to the plurality of 2D graphic objects 51a, 51b, 51c, 51d, 51e, 51f, and 51g, and menus "3D Slideshow" and "3D Foldering" related to the plurality of 3D graphic objects 50a, 50b, 50c, 50d, and 50e.

The user may select any of the menus included in the menu box 50 and a corresponding function may be controlled to be executed.

For example, a function of displaying the plurality of 2D graphic objects 51a, 51b, 51c, 51d, 51e, 51f, and 51g in a slideshow manner is matched to the menu "2D Slideshow".

Also, for example, a function of displaying only the plurality of 2D graphic objects 51*a*, 51*b*, 51*c*, 51*d*, 51*e*, 51*f*, and 51*g* on the touch screen 151 and making the plurality of 3D graphic objects 50*a*, 50*b*, 50*c*, and 50*d*, and 50*e* disappear from the touch screen 151 is matched to the menu "2D Foldering".

Also, for example, a function of displaying the plurality of 3D graphic objects 50*a*, 50*b*, 50*c*, and 50*d* in a slideshow manner is matched to the menu "3D Slideshow".

Also, for example, a function of displaying only the plurality of 3D graphic objects 50*a*, 50*b*, 50*c*, 50*d*, and 50*e* on the touch screen 151 and making the plurality of 2D graphic objects 51*a*, 51*b*, 51*c*, 51*d*, 51*e*, 51*f*, and 51*g* disappear from the touch screen 151 is matched to the menu "3D Foldering".

Figure 50:
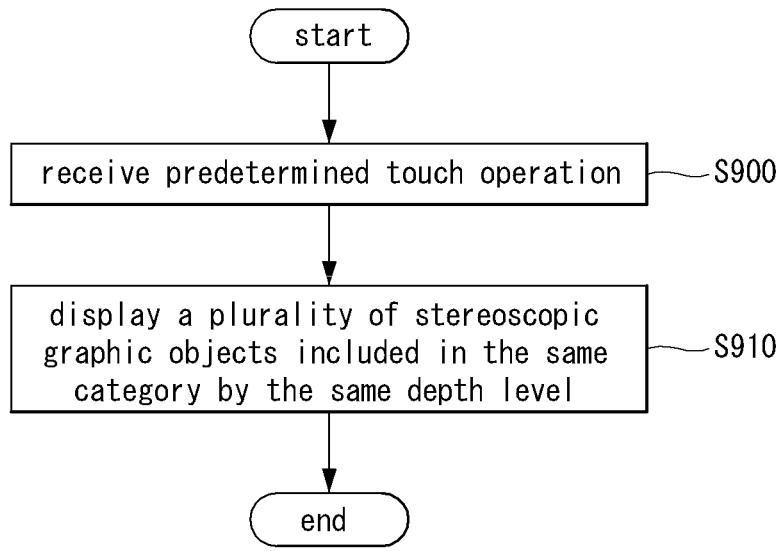
FIG. 50 is a flow chart illustrating a process of a method of controlling a mobile terminal according to a seventh embodiment of the present invention.
Figure 51:
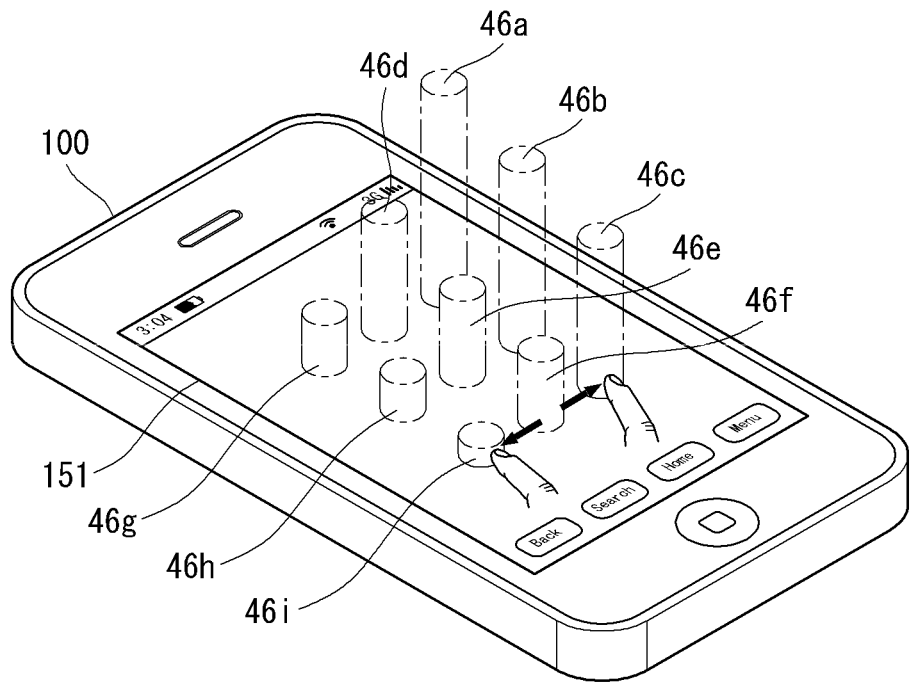
FIGS. 51 and 52 are views explaining the method of controlling a mobile terminal according to the seventh embodiment of the present invention.
Figure 52:
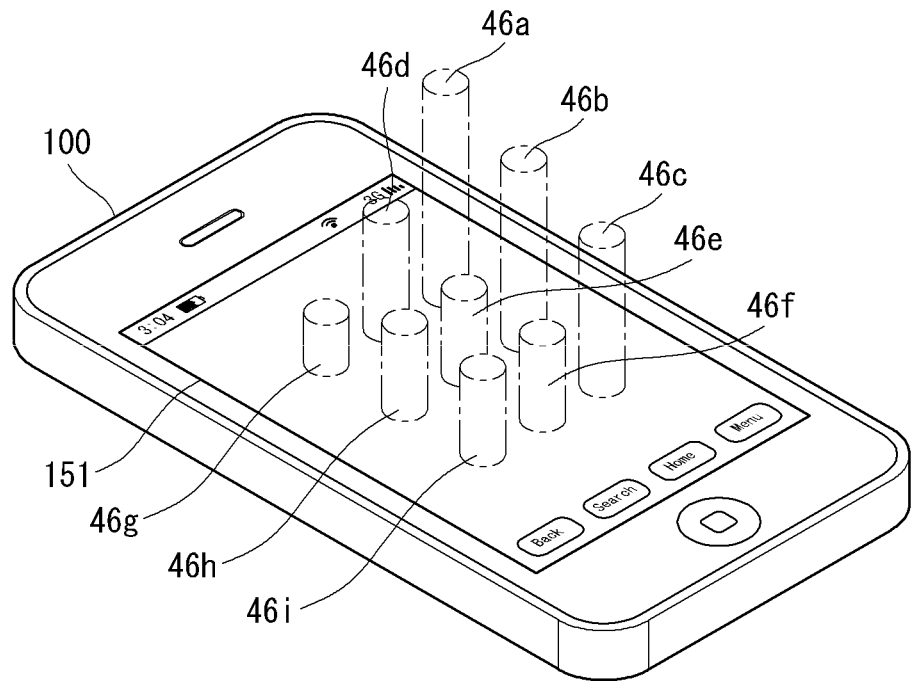

FIG. 50 is a flow chart illustrating a process of a method of controlling a mobile terminal according to a seventh embodiment of the present invention. FIGS. 51 and 52 are views explaining the method of controlling a mobile terminal according to the seventh embodiment of the present invention.

The method of controlling a mobile terminal according to the seventh embodiment of the present invention may be implemented in the mobile terminal 100 described above with reference to FIGS. 1 to 5. Hereinafter, the method of controlling a mobile terminal according to the seventh embodiment of the present invention and the operation of the mobile terminal 100 for implementing the same will now be described in detail with reference to the relevant drawings.

The method of controlling a mobile terminal according to the seventh embodiment of the present invention may be implemented based on the foregoing first embodiment of the present invention. Also, hereinafter, it is assumed that the display unit 151 is a touch screen.

With reference to FIG. 50, the controller 180 may receive a predetermined touch operation through the touch screen 151 displaying a plurality of stereoscopic graphic objects each having a different depth level (S900). The predetermined touch operation may include a direct touch and a proximity touch with respect to the touch screen 151.

As the predetermined touch operation is received, the controller 180 may display the plurality of stereoscopic graphic objects, which may be included in or classified into the same category among the plurality of displayed stereoscopic graphic objects, by the same depth level (S910).

FIGS. 51 and 52 illustrated examples of implementing steps S900 and S910.

The screen illustrated in FIG. 51 displays a plurality of 3D graphic objects 46*a*, 46*b*, 46*c*, 46*d*, 46*e*, 46*f*, 46*g*, 46*h*, and 46*i*.

It is assumed that a plurality of 3D graphic objects 46*e*, 46*f*, 46*h*, and 46*i* among the plurality of 3D graphic objects 46*a*, 46*b*, 46*c*, 46*d*, 46*e*, 46*f*, 46*g*, 46*h*, and 46*i* are classified into the same category.

For example, the plurality of 3D graphic objects 46*e*, 46*f*, 46*h*, and 46*i* may be icons corresponding to applications (e.g., phone call, a message, a phone book, a video call, etc.) in relation to communication.

Also, for example, the plurality of 3D graphic objects 46*e*, 46*f*, 46*h*, and 46*i* may be image information, and the plurality of the other remaining 3D graphic objects 46*a*, 46*b*, 46*c*, 46*d*, and 46*g* may not be image information.

With reference to FIG. 51, the controller 180 may receive a multi-touch operation such as an operation of opening the particular 3D graphic object 46*f* with two fingers from the user (S800).

As shown in FIG. 52, the controller 180 may display the plurality of 3D graphic objects 46*e*, 46*f*, 46*h*, and 46*i* included in the same category as that of the particular 3D graphic object 46, among the plurality of 3D graphic objects 46*a*, 46*b*, 46*c*, 46*d*, 46*e*, 46*f*, 46*g*, 46*h*, and 46*i*, by the same depth level.

Figure 53:
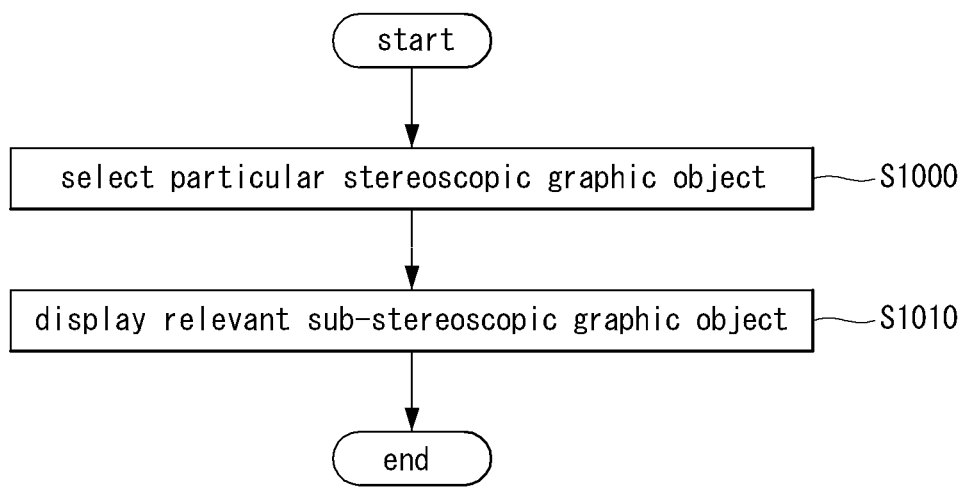
FIG. 53 is a flow chart illustrating a process of a method of controlling a mobile terminal according to an eighth embodiment of the present invention.
Figure 54:
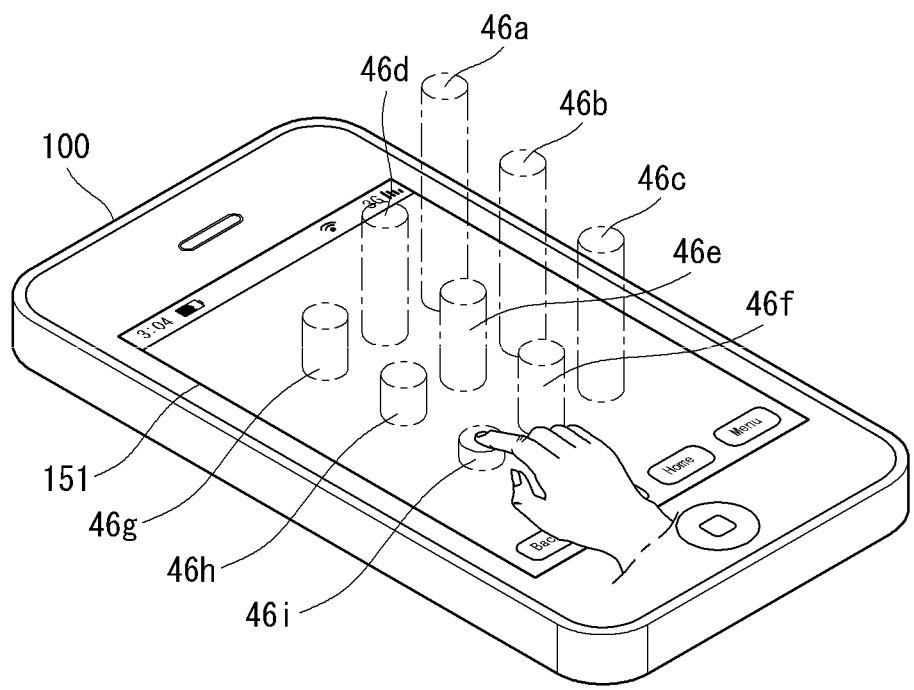
FIGS. 54 and 55 are views explaining the method of controlling a mobile terminal according to the eighth embodiment of the present invention.
Figure 55:
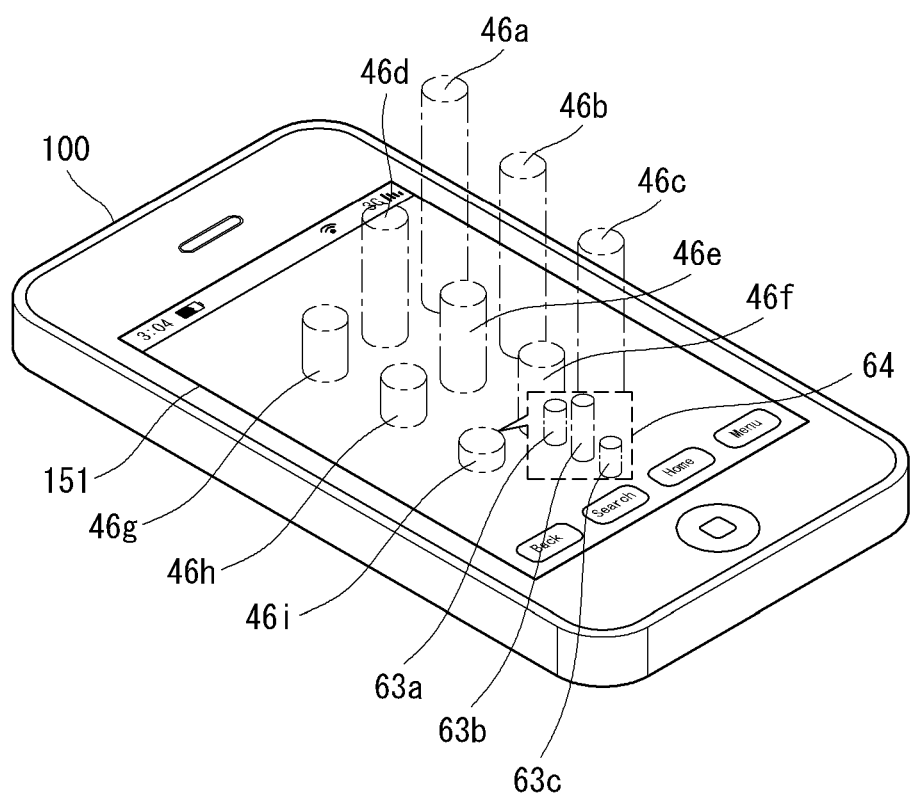

FIG. 53 is a flow chart illustrating a process of a method of controlling a mobile terminal according to an eighth embodiment of the present invention. FIGS. 54 and 55 are views explaining the method of controlling a mobile terminal according to the eighth embodiment of the present invention.

The method of controlling a mobile terminal according to the eighth embodiment of the present invention may be implemented in the mobile terminal 100 described above with reference to FIGS. 1 to 5. Hereinafter, the method of controlling a mobile terminal according to the eighth embodiment of the present invention and the operation of the mobile terminal 100 for implementing the same will now be described in detail with reference to the relevant drawings.

The method of controlling a mobile terminal according to the eighth embodiment of the present invention may be implemented based on the foregoing first embodiment of the present invention. Also, hereinafter, it is assumed that the display unit 151 is a touch screen.

With reference to FIG. 53, the controller 180 may receive a select signal with respect to a particular stereoscopic graphic object through the touch screen displaying a plurality of stereoscopic graphic objects (S1000).

The controller 180 may display at least one sub-stereoscopic graphic object related to the selected particular stereoscopic graphic object on the touch screen 151 (S1010).

FIGS. 54 and 55 illustrate an example of implementing steps S1000 and S1010.

The screen illustrated in FIG. 54 displays a plurality of 3D graphic objects 46*a*, 46*b*, 46*c*, 46*d*, 46*e*, 46*f*, 46*g*, 46*h*, and 46*i*.

For example, with reference to FIG. 54, the controller may receive a long touch signal with respect to the particular stereoscopic graphic object 46*i* (S1000). The long touch signal may be generated when the user maintains the touch with respect to the particular stereoscopic graphic object 46*i* for more than a predetermined time.

As the long touch signal with respect to the particular stereoscopic graphic object 46*i* is received, as shown in FIG. 55, the controller 180 may display a group 64 including sub-stereoscopic graphic objects 63*a*, 63*b*, and 63*c* related to the particular stereoscopic graphic object 46*i* on the touch screen 151.

For example, the sub-stereoscopic graphic object 63*a*, 63*b*, and 63*c* may indicate items included in a folder corresponding to the particular stereoscopic graphic object 46*i*.

Also, for example, the sub-stereoscopic graphic objects 63*a*, 63*b*, and 63*c* may indicate sub-menus included in a menu corresponding to the particular stereoscopic graphic object 46*i*.

Also, for example, when the particular stereoscopic graphic object 46*i* is an icon corresponding to a phone book (or a contact book), the sub-stereoscopic graphic objects 63*a*, 63*b*, and 63*c* may be a recently stored phone number list or a recent call list.

Also, for example, when the stereoscopic graphic object 46*i* is an icon corresponding to a message application, the sub-stereoscopic graphic objects 63*a*, 63*b*, and 63*c* may be a list of recently transmitted messages or a list of recently received messages.

Meanwhile, in FIG. 54, the depth level of the particular stereoscopic graphic object 46*i* may be determined in consideration of the depth level of a sub-stereoscopic graphic object in conformity with a predetermined reference, among the sub-stereoscopic graphic objects 63*a*, 63*b*, and 63*c*.

For example, the particular stereoscopic graphic object 46*i* may be displayed to have the same depth level as that of a sub-stereoscopic graphic object having the highest depth level among the sub-stereoscopic graphic objects 63*a*, 63*b*, and 63*c*.

Also, for example, the particular stereoscopic graphic object 46*i* may be displayed to have the same depth level as that of a sub-stereoscopic graphic object having the lowest depth level among the sub-stereoscopic graphic objects 63*a*, 63*b*, and 63*c*.

Also, for example, the particular stereoscopic graphic object 46*i* may be displayed to have the same depth level as an average depth level of the sub-stereoscopic graphic objects 63*a*, 63*b*, and 63*c*.

Figure 56:
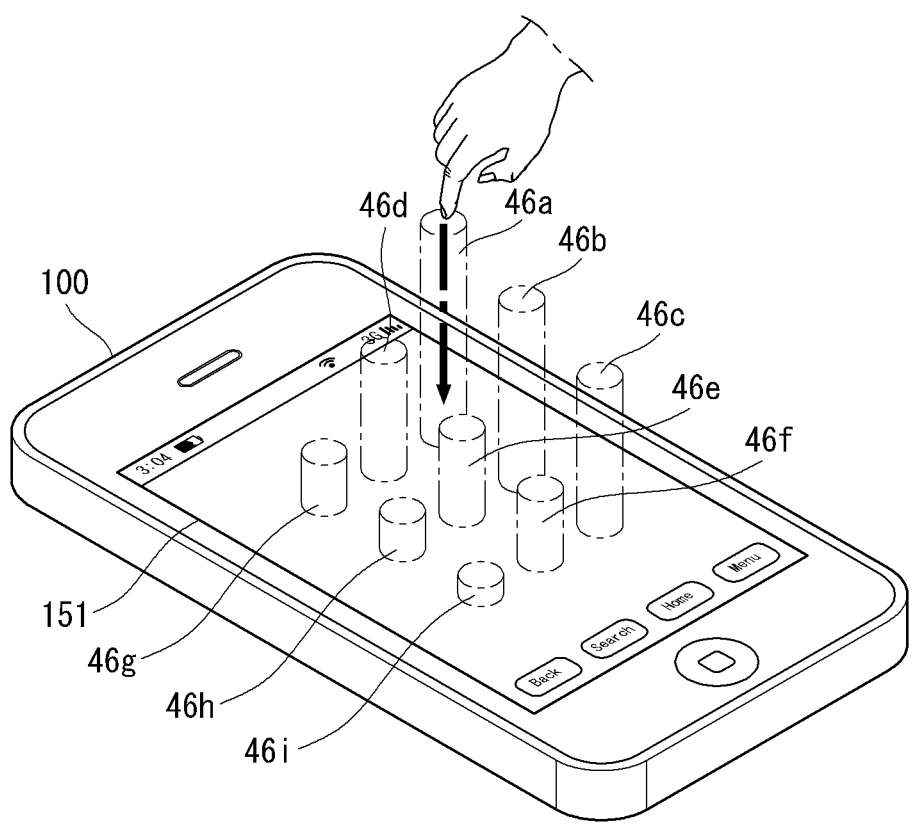
FIG. 56 is a view explaining a function of setting initialization according to adjustment of a depth level of a stereoscopic graphic object.

FIG. 56 is a view explaining a function of setting initialization according to adjustment of a depth level of a stereoscopic graphic object.

For example, with reference to FIG. 56, it is assumed that the particular stereoscopic graphic object 46*a* has a very high frequency of use by the user, so it is set to have a very high depth level.

In this case, when the user inputs a gesture of pressing the particular stereoscopic graphic object 46*a* by more than a certain depth, the controller 180 may initializes the user's access to or use of the particular stereoscopic graphic object 46*a* into a state of 0.

Here, the controller 180 obtains a distance by which the user presses the particular stereoscopic graphic object 46*a* with his finger by using the proximity sensor 141, and when the obtained distance satisfies a pre-set value, the controller 180 may initialize the user's access to or use of the particular stereoscopic graphic object 46*a* into a state of 0.

Also, when the particular stereoscopic graphic object 46*a* is set to be one of a bookmark list (or favorites), the embodiment described above with reference to FIG. 56 may also be applied to the case of releasing the set bookmark.

Figure 57:
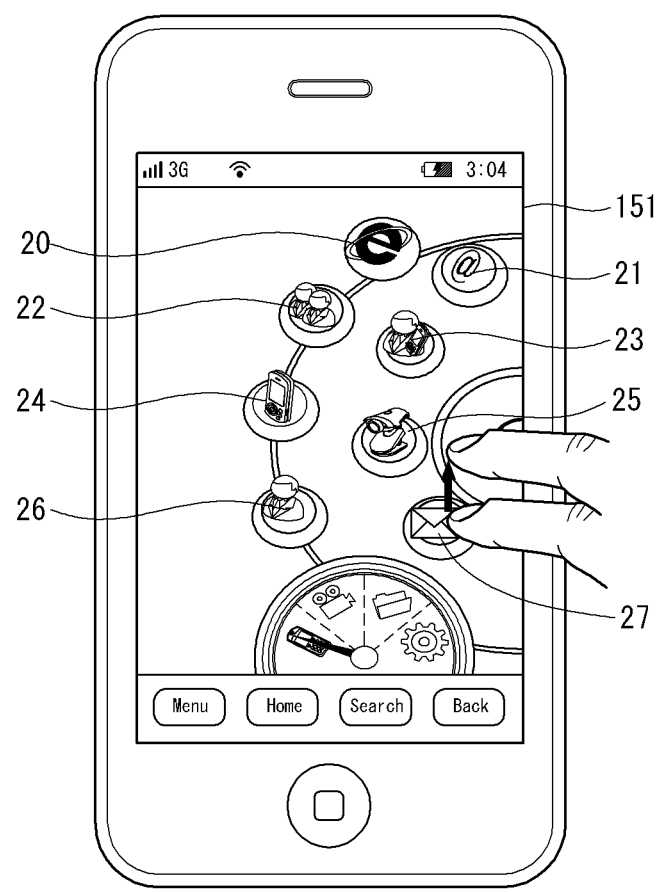
FIG. 57 is a view explaining a function of setting bookmark according to adjustment of a depth level of a stereoscopic graphic object.

FIG. 57 is a view explaining a function of setting bookmark according to adjustment of a depth level of a stereoscopic graphic object. It is assumed that a plurality of icons 20, 21, 22, 23, 24, 25, 26, and 27 illustrated in FIG. 57 are stereoscopic graphic objects using binocular parallax, respectively.

For example, with reference to FIG. 57, it is assumed that the particular stereoscopic graphic object 27 is not included in the bookmark list. As mentioned above, the usage pattern may include whether or not bookmark has been set. Thus, when the particular stereoscopic graphic object 27 is not included in the bookmark list, the controller 180 may set the particular stereoscopic graphic object 27 such that it has a depth level lower than those of the other stereoscopic graphic objects.

In this case, when the user touches the particular stereoscopic graphic object 27 with his finger and then inputs a gesture of raising it by more than a predetermined distance in a vertical direction, the controller 180 may set the particular stereoscopic graphic object 27 such that it is included in the bookmark list.

In this case, the controller 180 may obtain the distance by which the user raises his finger after touching the particular stereoscopic graphic object 27 by using the proximity sensor 141, and when the obtained distance satisfies a pre-set value, the controller 180 may set the particular stereoscopic graphic object 27 such that it is included in the bookmark list.

Figure 58:
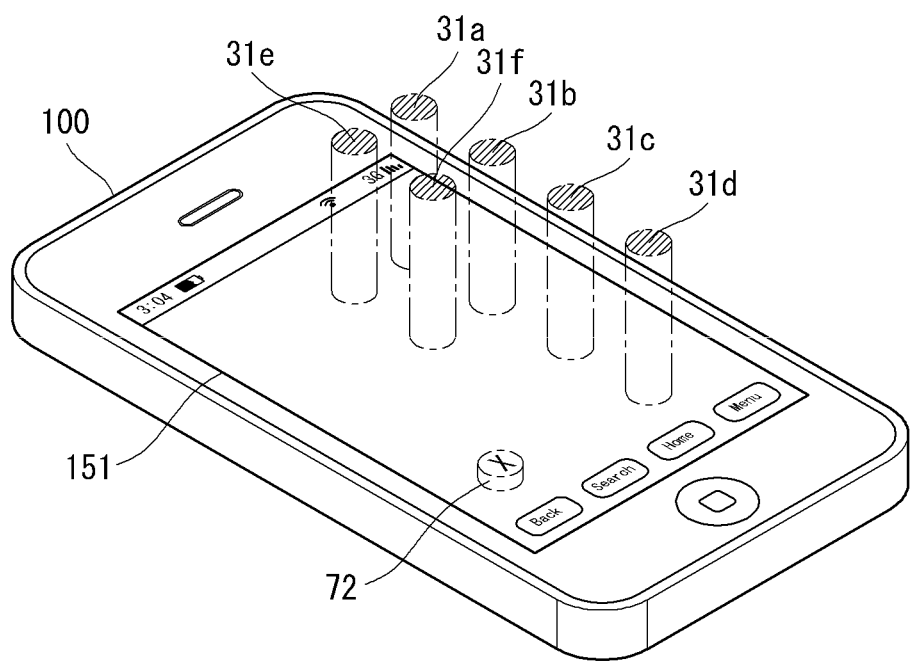
FIG. 58 is a view of an example embodiment of the present invention illustrating performing an additional operation on the resultant screen displaying searched or filtered items.

FIG. 58 is a view showing an example for explaining performing an additional operation on the resultant screen displaying the searched or filtered items according to embodiments of the present invention as described above.

For example, in FIG. 58, a speed icon 72 for performing deleting or returning is provided on the screen displaying the search result of FIG. 15.

When the user selects the speed icon 72, the controller 280 may return the current screen to the original screen illustrated in FIG. 13.

Meanwhile at least some of the diverse embodiments of the present invention as described above may be selectively combined to constitute a new embodiment.

For example, the fifth embodiment of the present invention described above with reference to FIGS. 41 to 47 and the eighth embodiment of the present invention described above with reference to FIGS. 53 to 55 may be mutually combined.

When the predetermined event mentioned in the fifth embodiment of the present invention as described above is detected, the controller 180 may group at least one stereoscopic graphic object corresponding to a particular category among the plurality of stereoscopic graphic objects displayed on the touch screen 151, and display a particular stereoscopic graphic object representing the grouped particular category on the touch screen 151.

Here, the controller 180 may determine the depth level of the particular stereoscopic graphic object representing the particular category according to the embodiment described in the latter part of the eighth embodiment of the present invention.

Namely, the controller 180 may determine the depth level of the stereoscopic graphic object of the particular stereoscopic graphic object representing the particular category in consideration of a depth level of a stereoscopic graphic object in conformity with a predetermined reference among a plurality of stereoscopic graphic objects corresponding to the particular category.

For example, the stereoscopic graphic object representing the particular category may be displayed to have the same depth level as that of a stereoscopic graphic object having the highest depth level among the plurality of stereoscopic graphic objects corresponding to the particular category.

Also, for example, the stereoscopic graphic object representing the particular category may be displayed to have the same depth level as that of a stereoscopic graphic object having the lowest depth level among the plurality of stereoscopic graphic objects corresponding to the particular category.

Also, for example, the stereoscopic graphic object representing the particular category may be displayed to have the same depth level as an average depth level of the plurality of stereoscopic graphic objects corresponding to the particular category.

The method of controlling a mobile terminal according to an embodiment of the present invention as described above can be written as a computer program that can be executed in a computer, in a computer readable recording medium.

The method of controlling a mobile terminal according to an embodiment of the present invention can be executed through software. When executed by software, the constituents of the embodiments of the present invention are code segments executing required operations. The program or the code segments may be stored in a processor-readable medium or transmitted by a computer data signal combined with a carrier from a transmission medium or a communication network.

The computer-readable recording medium includes any kind of recording device storing data that can be read by a computer system. Also, the computer-readable recording device includes a ROM, a RAM, a CD-ROM, a DVD-ROM, a DVD-RAM, a magnetic tape, a floppy disk, a hard disk, an optical data storage device, and the like. Also, codes which are distributed in computer devices connected by a network and can be read by a computer in a distributed manner are stored and executed in the computer-readable recording medium.

The foregoing embodiments and advantages are merely exemplary and are not to be construed as limiting the present invention. It will be apparent to those skilled in the art_that various modifications and variation can be made in the present invention without departing from the spirit or scope of the invention. Also, the embodiments of the present disclosure are not limited in its application of the configurations and methods, but the entirety or a portion of the embodiments can be selectively combined to be configured into various modifications.

What is claimed is:

1. A mobile terminal comprising:
a touch screen configured to implement stereoscopic vision;
a controller configured to:
cause the touch screen to display a plurality of stereoscopic graphic objects corresponding to a plurality of items by implementing binocular parallax such that a depth level of each of the plurality of displayed stereoscopic graphic objects is controlled based on a user's usage pattern with respect to a corresponding one of the plurality of items, wherein at least two of the plurality of displayed stereoscopic graphic objects have different depth levels, and wherein the usage pattern includes at least frequency of use, usage recency, or status of a bookmark setting;
specify a reference range based on a depth level of a particular stereoscopic graphic object and search at least one item having a usage pattern corresponding to a depth level that is within the specified reference range among the plurality of items in response to a touch input for selecting the particular stereoscopic graphic object from among the plurality of displayed stereoscopic graphic objects, wherein a minimum value of the reference range is less than or equal to the depth level of the selected particular stereoscopic graphic object, and a maximum value of the reference range is greater than or equal to the depth level of the selected particular stereoscopic graphic object; and
control the touch screen such that a three-dimensional (3D) display characteristic of the selected particular stereoscopic graphic object and a 3D display characteristic of at least one stereoscopic graphic object corresponding to the searched at least one item are same such that the 3D display characteristic of the selected particular stereoscopic graphic object and the at least one stereoscopic graphic object is different from 3D display characteristics of remaining stereoscopic graphic objects among the plurality of displayed stereoscopic graphic objects having depth levels that are not within the specified reference range; and
a memory configured to store the user's usage pattern, wherein each of the at least two of the plurality of displayed stereoscopic graphic objects is associated with a different usage pattern of a corresponding one of the plurality of items such that the at least two of the plurality of displayed stereoscopic graphic objects have different depth levels prior to receiving the touch input for selecting the particular stereoscopic graphic object.

2. The mobile terminal of claim 1, wherein the 3D display characteristic includes at least a depth level, a slope, or a shade of the at least one stereoscopic graphic object.

3. The mobile terminal of claim 2, wherein the slope includes an angle at which the at least one stereoscopic graphic object tilts or a direction of the at least one stereoscopic graphic object.

4. The mobile terminal of claim 2, wherein the controller is further configured to search the plurality of displayed stereoscopic objects for at least one stereoscopic graphic object corresponding to a detected predetermined first event and to provide search results.

5. The mobile terminal of claim 4, wherein the predetermined first event includes at least a touch operation or a gesture input, the touch operation including at least a direct touch and a proximity touch, or the gesture input including at least a two-dimensional (2D) gesture input or a 3D gesture input.

6. The mobile terminal of claim 1, wherein the usage pattern further includes status of a stereoscopic graphic object activation.

7. The mobile terminal of claim 1, wherein:
the specified reference range is displayed on the touch screen in a manner different from the display of the remaining stereoscopic graphic objects and in a manner determined by the depth level of the selected particular stereoscopic graphic object within a margin of error.

8. The mobile terminal of claim 7, wherein the margin of error is either lower than the depth level of the selected particular stereoscopic graphic object or higher than the depth level of the selected particular stereoscopic graphic object.

9. The mobile terminal of claim 8, wherein the controller is further configured to control the touch screen to display the plurality of stereoscopic graphic objects with a same depth level, when the displayed plurality of stereoscopic graphic objects are scrolled, during a scrolling state.

10. The mobile terminal of claim 9, wherein the controller is further configured to control the touch screen to display only a stereoscopic graphic object having the same depth level within the margin of error as that of the at least one stereoscopic graphic object, during the scrolling state.

11. The mobile terminal of claim 9, wherein the controller is further configured to disregard a depth level during the scrolling state according to the user's usage pattern and to cause the touch screen to display the plurality of stereoscopic graphic objects according to a predetermined depth level.

12. The mobile terminal of claim 1, wherein the controller is further configured to display only the at least one stereoscopic graphic object on the touch screen and to delete the remaining stereoscopic graphic objects from the touch screen.

13. The mobile terminal of claim 1, wherein the controller is further configured to cause the touch screen to display the at least one stereoscopic graphic object in an emphasized visual manner.

14. The mobile terminal of claim 1, wherein the controller is further configured to display the at least one stereoscopic graphic object on the touch screen, the depth level of the at least one stereoscopic graphic object included in a depth level range of two selected stereoscopic graphic objects, when a touch operation is received, the touch operation including simultaneously selecting the two stereoscopic graphic objects from among the plurality of displayed stereoscopic graphic objects.

15. The mobile terminal of claim 1, wherein the controller is further configured to display only one group among a plurality of two dimensional (2D) graphic objects and the plurality of stereoscopic graphic objects on the touch screen, when a predetermined multi-touch operation is received via the touch screen.

16. The mobile terminal of claim 1, wherein the controller is further configured to change a depth level of at least one stereoscopic graphic object corresponding to a first event and to maintain depth levels of the other of the plurality of stereoscopic graphic objects.

17. The mobile terminal of claim 16, wherein the first event is a predetermined input signal received via the touch screen.

18. The mobile terminal of claim 17, wherein the controller is further configured to change the depth level of at least one stereoscopic graphic object corresponding to an application being executed.

19. The mobile terminal of claim 18, wherein the controller is further configured to return the depth level of the at least one stereoscopic graphic object to an initial depth level, when the predetermined input signal is received at least a second time.

20. The mobile terminal of claim 18, wherein the controller is further configured to stop execution of the application being executed when the predetermined input signal is received at least a second time.

21. The mobile terminal of claim 16, wherein the controller is further configured to change the depth level of the at least one corresponding stereoscopic graphic object according to a predetermined second event, wherein the predetermined second event includes automatic execution of a particular application or receipt of data.

22. The mobile terminal of claim 1, wherein the controller is further configured to display menus related to the plurality of stereoscopic graphic objects on the touch screen, in response to a predetermined touch operation.

23. The mobile terminal of claim 1, wherein the controller is further configured to classify two or more of the plurality of stereoscopic graphic objects into a same category according to a plurality of displayed stereoscopic graphic objects having a same depth level.

24. The mobile terminal of claim 1, wherein the controller is further configured to display at least one sub-stereoscopic graphic object related to the at least one stereoscopic graphic object having a same depth level as the at least one stereoscopic graphic object on the touch screen.

25. A method of controlling a mobile terminal, the method comprising:
displaying a plurality of stereoscopic graphic objects corresponding to a plurality of items on a touch screen by implementing binocular parallax such that a depth level of each of the plurality of displayed stereoscopic graphic objects is controlled based on a user's usage pattern with respect to a corresponding one of the plurality of items, wherein at least two of the plurality of displayed stereoscopic graphic objects have different depth levels, and wherein the usage pattern includes at least frequency of use, usage recency, or status of a bookmark setting;
storing the user's usage pattern in a memory;
specifying a reference range based on a depth level of a particular stereoscopic graphic object and searching at least one item having a usage corresponding to a depth level that is within the specified reference range among the plurality of items in response to a touch input for selecting the particular stereoscopic graphic object from among the plurality of displayed stereoscopic graphic objects, wherein a minimum value of the reference range is less than or equal to the depth level of the selected particular stereoscopic graphic object, and a maximum value of the reference range is greater than or equal to the depth level of the selected particular stereoscopic graphic object; and
controlling the touch screen such that a three-dimensional (3D) display characteristic of the selected particular stereoscopic graphic object and a 3D display characteristic of at least one stereoscopic graphic object corresponding to the searched at least one item are same such that the 3D display characteristic of the selected particular stereoscopic graphic object and the at least one stereoscopic graphic object is different from 3D display characteristics of remaining stereoscopic graphic objects among the plurality of displayed stereoscopic graphic objects having depth levels that are not within the specified reference range,
wherein each of the at least two of the plurality of displayed stereoscopic graphic objects is associated with a different usage pattern of a corresponding one of the plurality of items such that the at least two of the plurality of displayed stereoscopic graphic objects have different depth levels prior to receiving the touch input for selecting the particular stereoscopic graphic object.

26. The method of claim 25, wherein the 3D display characteristic includes at least a depth level, a slope, or a shade of the at least one stereoscopic graphic object.

27. The method of claim 26, wherein the slope includes at least an angle at which the at least one stereoscopic graphic object tilts or a direction of the at least one stereoscopic graphic object.

28. The method of claim 25, further comprising controlling 3D display characteristics of the plurality of displayed stereoscopic graphic objects, searching the plurality of displayed stereoscopic objects for at least one stereoscopic graphic object corresponding to a detected predetermined event and providing at least one result.

29. The method of claim 28, wherein the predetermined event includes at least a touch operation or a gesture input, the touch operation including at least a direct touch or a proximity touch, or the gesture input including at least a two-dimensional (2D) gesture input or a 3D gesture input.

30. The method of claim 28, wherein the user's usage pattern further includes status of a stereoscopic graphic object activation.

* * * * *